(12) United States Patent
Hashiba et al.

(10) Patent No.: US 7,387,832 B2
(45) Date of Patent: *Jun. 17, 2008

(54) FLAT PARTICLES AND PROCESS FOR PRODUCTION THEREOF

(75) Inventors: Toshifumi Hashiba, Chiba (JP); Kazutoshi Hayakawa, Chiba (JP); Takaya Sato, Chiba (JP); Hiroshi Yoshida, Chiba (JP)

(73) Assignee: Nisshinbo Industries, Inc., Tokyo (JP)

( * ) Notice: Subject to any disclaimer, the term of this patent is extended or adjusted under 35 U.S.C. 154(b) by 235 days.

This patent is subject to a terminal disclaimer.

(21) Appl. No.: 10/527,636

(22) PCT Filed: Sep. 10, 2003

(86) PCT No.: PCT/JP03/11587

§ 371 (c)(1),
(2), (4) Date: Mar. 15, 2005

(87) PCT Pub. No.: WO2004/026945

PCT Pub. Date: Apr. 1, 2004

(65) Prior Publication Data

US 2006/0052549 A1 Mar. 9, 2006

(30) Foreign Application Priority Data

Sep. 19, 2002 (JP) .................... 2002-273936

(51) Int. Cl.
*B32B 5/16* (2006.01)
(52) U.S. Cl. .................... 428/402; 428/403; 428/407
(58) Field of Classification Search ................ 428/402, 428/403, 404, 405, 406, 407
See application file for complete search history.

(56) References Cited

U.S. PATENT DOCUMENTS

| | | | |
|---|---|---|---|
| 5,958,516 A | 9/1999 | Imashiro et al. | |
| 6,127,029 A | 10/2000 | Imashiro et al. | |
| 6,127,477 A | 10/2000 | Imashiro et al. | |
| 6,794,448 B2* | 9/2004 | Sakuma .................... | 524/832 |
| 6,866,934 B2* | 3/2005 | Takahashi et al. .......... | 428/402 |
| 7,258,921 B2* | 8/2007 | Hashiba et al. ............. | 428/402 |
| 2005/0118424 A1 | 6/2005 | Takahashi et al. | |
| 2005/0271875 A1 | 12/2005 | Hashiba et al. | |

FOREIGN PATENT DOCUMENTS

| | | |
|---|---|---|
| EP | 0 566 118 A1 | 10/1993 |
| EP | 0 878 496 A1 | 11/1998 |
| EP | 1 258 290 A2 | 11/2002 |
| EP | 1 266 908 A1 | 12/2002 |
| EP | 1 344 795 A2 | 9/2003 |
| JP | 43-15689 B1 | 7/1968 |
| JP | 63-116695 | 5/1988 |
| JP | 1-297430 | 11/1989 |
| JP | 2-8272 | 1/1990 |
| JP | 2-14222 | 1/1990 |
| JP | 04-021637 | 1/1992 |
| JP | 7-179613 | 7/1995 |
| JP | 8-202074 | 8/1996 |
| JP | 2733087 | 12/1997 |
| JP | 10-030024 | 2/1998 |
| JP | 10-060272 | 3/1998 |
| JP | 2865534 | 12/1998 |
| JP | 2918607 | 4/1999 |
| JP | 2000-39506 | 2/2000 |
| JP | 2000-119539 A | 4/2000 |
| JP | 2000-155441 | 6/2000 |
| JP | 2001-66304 A | 3/2001 |
| JP | 2001-175020 | 6/2001 |
| JP | 3229011 | 9/2001 |
| JP | 2001-310904 | 11/2001 |
| JP | 2001-342377 | 12/2001 |
| JP | 2002-201286 A | 7/2002 |
| JP | 2002-258513 | 9/2002 |
| JP | 2003-268118 | 9/2003 |
| JP | 2003-268118 A | 9/2003 |
| WO | WO 91/15177 A1 | 10/1991 |
| WO | WO 95/10995 A1 | 4/1995 |
| WO | WO 97/49387 A1 | 12/1997 |
| WO | WO-98/34969 | 8/1998 |
| WO | WO 99/11703 A1 | 3/1999 |
| WO | WO-01/70826 A1 | 9/2001 |
| WO | WO-01/89592 A2 | 11/2001 |
| WO | WO-01/91815 A2 | 12/2001 |

* cited by examiner

*Primary Examiner*—Robert D. Harlan
(74) *Attorney, Agent, or Firm*—Westerman, Hattori, Daniels & Adrian, LLP.

(57) ABSTRACT

Flaky particles which are produced through easy conversion from mother particles by using an organic compound other than monomers having double bonds as the hardening and crosslinking agent and to which at least one mechanical or functional characteristic selected from among reactivity, close adhesion, and tackiness is imparted by the presence of part of the unreacted reactive groups of the organic compound inside and on the particles; and a process for the production of the flaky particles. More specifically, flaky particles composed of mother particles (A) having functional groups and an organic compound (B) which has groups reactive with the functional groups of the particles (A) and is soluble in a solvent, characterized in that at least part of the functional groups of the mother particles (A) and at least part of the reactive groups of the organic compound (B) react with each other to form crosslinks.

15 Claims, 4 Drawing Sheets

FLAT PARTICLES AND PROCESS FOR PRODUCTION THEREOF

BACKGROUND OF THE INVENTION

1. Field of the Invention

The present invention relates to a flat particle and a process for producing the same, more particularly a flat particle composed of a base particle (A) having a functional group and an organic compound (B) having a reactive group reactive with the functional groups of said base particle (A) and which is soluble in a solvent, characterized in that at least a part of the base particle (A) and at least a part of the organic compound (B) react each other to form crosslinked structure, and a process for producing the same.

2. Description of the Prior Art

In general, a flat particle is superior to a spherical particle in hiding power, whiteness and light diffusion, and the like, and thus it has been commercialized in electric material fields including static charge developers (e.g. see Japanese Patent Application Laid-Open No. 8-202074), paint and coating materials for paper or information recording paper (e.g. see Japanese Patent Application Laid-Open No. 2-14222), adhesive agents (e.g. see Japanese Patent No. 2865534), light diffusion sheets (e.g. see Japanese Patent Application Laid-Open No. 2000-39506), etc.

Further, a flat particle furnished with a hydrophilic group has moisture retainability and absorbability and thus has been applied to various fields including fragrance, cosmetics, drug and pesticides (e.g. see Japanese Patent Nos. 2733087 and 3229011) and construction materials (e.g. see Japanese Patent No. 2918607), etc.

In general, a flat particle or a hollow particle is considered to become flat by impregnation (absorption) of a vinyl monomer including a crosslinkable monomer (a monomer having a multifunctional unsaturated double bond) into a base particle (suspension particle and emulsion particle) and thus monomer concentration in a particle is increased, which contributes generation of such a cycle as increase in polymerization rate, increase in crosslink density, shrinkage by polymerization and enhancement of layer separation by polymerization with a radical initiator.

However, a step to impregnate (absorb) a vinyl monomer including a crosslinkable monomer into a base particle must be performed in two layer region of hydrophobic region and water medium or hydrophilic medium, which requires an impregnation (absorption) step into a particle using a unit such as a high speed agitator or a homogenizer, and thus provides cost disadvantage and a problem of long processing time required.

Insufficient impregnation and absorption of a monomer into a particle or insufficient dispersion degree of a particle with an impregnated and absorbed monomer may cause a quality problem due to generation of a non-spherical particle or wider change or distribution of morphology and diameter of flat particles formed.

Therefore, objects of the present invention are, in view of the above-described problems, to provide a flat particle maintaining at least one mechanical and functional characteristics selected from reactivity, glueability and tackiness by using an organic compound other than a monomer with a double bond as a hardening agent and a crosslinking agent of a particle to make possible easy change from a base particle to a flat particle, and by adhering a residual organic compound (including a reactive group) to bond to inside and the surface of a flat particle and a method for producing the same.

SUMMARY OF THE INVENTION

The inventors of the present invention have found, after having extensively studied to attain the above-described objectives, that a flat particle having crosslinked structure with a new bond group comprising of a functional group in a particle and an organic compound which can dissolve in a solvent, can easily be formed without depending on a bond having crosslinked structure obtained by vinyl polymerization and formation of non-spherical particle or morphology, diameter and distribution of a flat particle can easily be controlled.

The inventors of the present invention have also found that polymerization with functional groups in a particle can be started all at once, different from conventional vinyl polymerization where polymerization proceeds in chain reaction from a polymerization start point, and reaction rate can be increased efficiently, and further crosslink density is also easily controllable by adjustment of the amount of functional groups in a base particle and the amount of reactive groups contained by an organic compound used for bonding, and furthermore, a flat particle, having multi-functions such as adhesion, glueability, tackiness, dispersibility, and the like, can also be formed, by residing an organic compound bonded to a base particle at the surface and inside a flat particle. The present invention is developed based on the above knowledge.

That is the first aspect of the present invention provides a flat particle comprising a base particle (A) having functional groups and an organic compound (B) having reaction groups reactive with the functional groups of said base particle (A) and which is soluble in a solvent, characterized in that at least a part of the functional groups present in the base particle (A) and at least a part of the reaction groups present in the organic compound (B) react each other to form crosslinked structure.

The second aspect of the present invention provides the flat particle according to the first aspect of the present invention, characterized in that the functional group of the above-described base particle (A) is an active hydrogen group.

The third aspect of the present invention provides the flat particle according to the second aspect of the present invention, characterized in that the active hydrogen group of the above-described base particle (A) is at least one functional group selected from a hydroxyl group, a carboxyl group, an amino group or a thiol group.

The fourth aspect of the present invention provides the flat particle according to the first aspect of the present invention, characterized in that the amount of the functional group of the base particle (A) is 50 to 700 equivalents.

The fifth aspect of the present invention provides the flat particle according to the first aspect of the present invention, characterized in that the reaction group of the organic compound (B) is at least one reaction group selected from an amino group, an epoxy group, an oxazoline group or a carbodiimide group.

The sixth aspect of the present invention provides the flat particle according to the first aspect of the present invention, characterized in that the amount of the reaction group of the organic compound (B) is 50 to 1,000 equivalents.

The seventh aspect of the present invention provides the flat particle according to the first aspect of the present invention, characterized in that at least a part of the reaction groups in the organic compound (B), which has not reacted with the functional group of the base particle (A), resides at the surface of the base particle (A), and thus at least one of characteristics selected from glueability, tackiness, adhesion or dispersibility in a solution is furnished.

The eighth aspect of the present invention provides the flat particle according to the first aspect of the present invention, characterized in that other fine particles are further attached or contained at the surface or the inner part of the particle.

The ninth aspect of the present invention provides a method for producing the flat particle according to anyone of claims 1 to 8, characterized by comprising the first step wherein a base particle (A) having a functional group and not containing a monomer with an unsaturated double bond and an organic compound (B) which has a reaction group reactive with the functional group of said base particle (A) are made to mixed state in the presence of at least one kind of a solvent selected from an organic solvent or water which is a non-solvent for the former but a solvent for the latter, the second step wherein crosslinked structure is provided by reaction of the base particle (A) and the organic compound (B), and the third step wherein a pure particle is obtained by removing a solvent from a solution of a particle obtained.

The tenth aspect of the present invention provides the method for producing the flat particle according to the ninth aspect of the present invention, characterized by adding the step wherein fine particles are added in any of the first to the third steps or after these steps.

The $11^{th}$ aspect of the present invention provides the method for producing the flat particle according to the ninth or tenth aspect of the present invention, characterized in that the organic compound (B) is at least one kind selected from a carbodiimide compound, an epoxy compound, an oxazoline compound or an amino compound.

The $12^{th}$ aspect of the present invention provides the method for producing the flat particle according to the ninth or tenth aspect of the present invention, characterized in that the amount of the reaction group of the organic compound (B) is 50 to 1,000 equivalents.

The $13^{th}$ aspect of the present invention provides the method for producing the flat particle according to the ninth or tenth aspect of the present invention, characterized in that the amount of the functional group of the base particle (A) is 50 to 700 equivalents.

As described-above, the present invention relates to a flat particle, characterized by being composed of a base particle (A) having a functional group and an organic compound (B) having a reactive group reactive with the functional groups of said base particle (A) and which is soluble in a solvent, characterized in that at least a part of the base particle (A) and at least a part of the organic compound (B) react each other to form crosslinked structure and the preferred embodiments include the followings:

(1) A flat particle according to the first aspect of the present invention, characterized in that the base particle (A) is spherical or nearly spherical.

(2) A flat particle according to the first aspect of the present invention, characterized in that average particle diameter of the base particle (A) is 0.01 to 300 µm.

(3) A flat particle according to the first aspect of the present invention, characterized in that the base particle (A) is a thermoplastic resin.

(4) A flat particle according to the first aspect of the present invention, characterized in that at least a part of reactive groups in the organic compound (B) not reacted with functional groups of the base particle (A) resides at the surface and inside of the base particle (A).

(5) A flat particle according to the first aspect of the present invention, characterized in that the organic compound (B) is a carbodiimide compound.

(6) A flat particle according to the above (5) aspect of the present invention, characterized in that the carbodiimide compound is a carbodiimide resin represented by the following chemical formula (1):

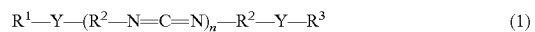

$$R^1-Y-(R^2-N=C=N)_n-R^2-Y-R^3 \qquad (1)$$

(wherein, $R^1$ and $R^3$ are each hydrogen or an organic residue of 1 to 40 carbon atoms, which is a compound having a functional group reactive with an isocyanate group left by the functional group, and may be the same or different; $R^2$ is an organic residue which is a diisocyanate left by the isocyanate group, where the diisocyanates may be different; Y is a bond formed by the isocyanate group and a functional group reactive with the isocyanate group; "n" is an integer of 1 to 100, representing average degree of polymerization; and each of $R^1-Y$ and $Y-R^3$ may be the isocyanate group halfway in the reaction to be converted into the carbodiimide).

(7) A flat particle according to the above (5) aspect of the present invention, characterized in that the carbodiimide compound has at least one kind of a hydrophilic segment and is soluble in water.

(8) A flat particle according to the first aspect of the present invention, characterized in that the organic compound (B) is an epoxy compound, an oxazoline compound or an amino compound.

(9) A process for producing a flat particle according to the ninth or tenth aspect of the present invention, characterized in that mixing ratio of the base particle (A) and the organic compound (B) in the first step is such that reactive groups of the organic compound (B) is from 0.1 to 8 equivalents based on 1 equivalent of a functional group of the base particle (A).

(10) A process for producing a flat particle according to the ninth or tenth aspect of the present invention, characterized in that reaction temperature is from 15 to 150° C. and reaction time is from 1 to 6 hours in the second step.

DETAILED DESCRIPTION OF THE INVENTION

1. A Flat Particle

A flat particle of the present invention is such one as comprises a base particle (A) having a functional group and an organic compound (B) having a reactive group reactive with the functional group of the base particle (A), wherein at least a part of the base particle (A) and at least a part of organic compound (B) are bonded each other by a crosslinking reaction to furnish a flat particle mechanical and functional characteristics.

Said organic compound (B) is mainly a carbodiimide compound, an epoxy compound, an oxazoline compound, an amino compound, and the like, which is mixed with the base particle (A) having a group reactive with the organic compound (B) (a hydroxyl group, an amino group, a carboxyl group, a thiol group, etc.), in a solvent not to dissolve the particle but dissolves the organic compound (B), and subjected to a crosslinking reaction to provide a flat particle with crosslinked structure formed, without containing a monomer having a multi-functional unsaturated double bond.

Figure 1:
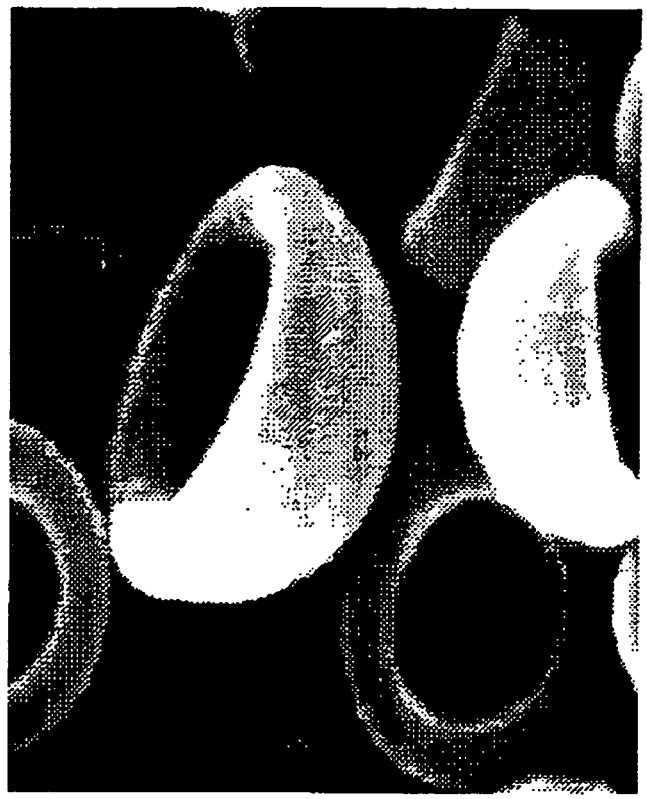
FIG. 1 shows a typical photograph of a flat particle.
Figure 2:
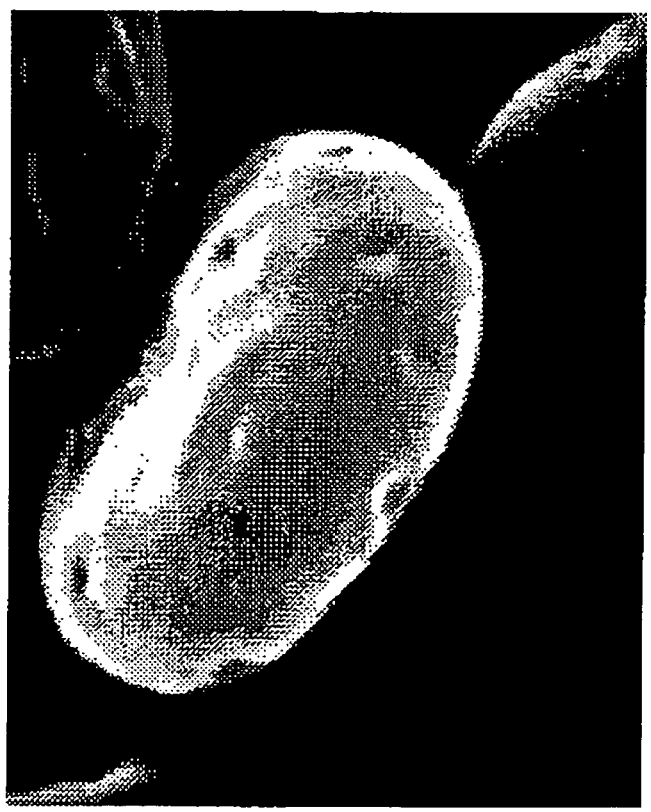
FIG. 2 shows a typical other photograph of a flat particle.
Figure 3:
FIG. 3 shows a typical other photograph of a flat particle.

In the present invention, a flat particle is defined one to have ratio between flat surface diameter (D) and particle thickness (d), (D/d) in the range from 1.0 to 5.0, for example, nearly hemispherical or nearly semi-elliptic, which further exemplified one having concave part in at least one flat surface side in 2D projection view. FIGS. 1 to 3 show typical photographs in accordance with the flat particle concept.

2. An Organic Compound (B)

An organic compound (B) relevant to a flat particle of the present invention is not specifically limited as long as it has at least one reactive group reactive with a functional group of a base particle (A), however, it is desirable to have at least 2 reactive groups and in view of reactivity, commercial product availability, cost, and the like, a carbodiimide compound, an epoxy compound, an amino compound, an oxazoline compound, and the like are preferable.

(1) A Carbodiimide Compound

The carbodiimide compound relevant to the above-described organic compound (B) of the present invention is the carbodiimide resin (or polycarbodiimide resin) represented by the following chemical formula (1):

$$R^1-Y-(R^2-N=C=N)_n-R^2-Y-R^3 \tag{1}$$

(wherein, $R^1$ and $R^3$ are each hydrogen or an organic residue of 1 to 40 carbon atoms, which is a compound having a functional group reactive with an isocyanate group left by the functional group, and may be the same or different; $R^2$ is an organic residue which is a diisocyanate left by the isocyanate group, where the diisocyanates may be different; Y is a bond formed by the isocyanate group and a functional group reactive with the isocyanate group; "n" is an integer of 1 to 100, representing average degree of polymerization; and each of $R^1-Y$ and $Y-R^3$ may be the isocyanate group halfway in the reaction to be converted into the carbodiimide).

In more detail, $R^1$ or $R^3$ in the chemical formula (1) is at least one kind of segment composed of a residue represented by a compound having a functional group or bond reactive with an isocyanate group.

The representative examples of the functional group or bond reactive with an isocyanate group include:
(a) hydroxide group —OH (including H₂O)
(b) mercapto group —SH
(c) amino group —NH2
(d) carboxyl group —COOH
(e) isocyanate group —NCO
(f) urethane bond —NHCOO—
(g) urea bond —NHCONH—
(h) amide bond —NHCO—
(i) carbodiimide bond —NCN—
(j) dimerized isocyanate bond

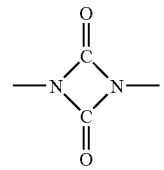

More specifically, the representative compounds reactive with an isocyanate group include:

(a) compounds containing hydroxyl group (—OH): (i) monovalent alcohols, e.g., methyl alcohol, ethyl alcohol, propyl alcohol, isopropyl alcohol, n-butyl alcohol, sec-butyl alcohol and tert-butyl alcohol; (ii) saturated or unsaturated glycols, e.g., ethylene glycol, propylene glycol, trimethylol propane, pentaerythritol, 1,2-propanediol, 1,3-propanediol, 1,3-butanediol, 1,4-butanediol, neopentyl glycol, pentanediol, hexanediol, octanediol, 1,4-butanediol, diethylene glycol, triethylene glycol and dipropylene glycol; (iii) cellosolve; e.g., methyl cellosolve, ethyl cellosolve and butyl cellosolve; (iv) (meth)acryl-based monomers, e.g., 2-hydroxyethyl(meth)acrylate, 2-hydroxypropyl(meth)acrylate, 3-hydroxypropyl(meth)acrylate and 4-hydroxybutyl(meth)acrylate; (v) polyalkylene glycol(meth)acryl-based compounds, e.g., polyethylene glycol mono(meth)acrylate and polypropylene glycol mono(meth)acrylate; (vi) various types of hydroxyalkyl vinyl ethers, e.g., hydroxyethyl vinyl ether and hydroxybutyl vinyl ether; (vii) various allyl compounds, e.g., allyl alcohol and 2-hydroxyethyl allyl ether; (viii) alkyl glycidyl ethers, e.g., n-butyl glycidyl ether and 2-ethylhexyl glycidyl ether; and (ix) high-molecular-weight compounds containing hydroxyl group, e.g., polyethylene glycol and polypropylene glycol. These compounds may be used either individually or in combination;

(b) compounds containing mercapto group: (i) aliphatic alkyl mono-functional thiols, e.g., methanethiol, ethanethiol, n- and iso-propanethiol, n- and iso-butanethiol, pentanethiol, hexanethiol, heptanethiol, octanethiol, nonanethiol, decanethiol and cyclohexanethiol; (ii) aliphatic thiols having a heterocyclic ring, e.g., 1,4-dithian-2-thiol, 2-(1-mercaptomethyl)-1,4-dithian, 2-(1-mercaptoethyl)-1,4-dithian, 2-(1-mercaptopropyl)-1,4-dithian, 2-(mercaptobutyl)-1,4-dithian, tetrahydrothiophene-2-thiol, tetrahydrothiophene-3-thiol, pyrrolidine-2-thiol, pyrrolidine-3-thiol, tetrahydrofuran-2-thiol, tetrahydrofuran-3-thiol, piperidine-2-thiol, piperidine-3-thiol and piperidine-4-thiol; (iii) aliphatic thiols having a hydroxy group, e.g., 2-mercaptoethanol, 3-mercaptopropanol and thioglycerol; (iv) compounds having an unsaturated double bond, e.g., 2-mercaptoethyl(meth)acrylate, 2-mercapto-1-carboxyethyl(meth)acrylate, N-(2-mercaptoethyl)acrylamide, N-(2-mercapto-1-carboxyethyl) acrylamide, N-(2-mercaptoethyl)methacrylamide, N-(4-mercaptophenyl)acrylamide, N-(7-mercaptonaphthyl) acrylamide and mono-2-mercaptoethylamide maleate; (v) aliphatic dithiols, e.g., 1,2-ethanedithiol, 1,3-propanedithiol, 1,4-butanedithiol, 1,6-hexanedithiol, 1,8-octanedithiol, 1,2-cyclohexanedithiol, ethylene glycol bisthioglycolate, ethylene glycol bisthiopropionate, butanediol bisthioglycolate, butanediol bisthiopropionate, trimethylolpropane tristhioglycolate, trimethylolpropane tristhiopropionate, pentaerythritol tetrakisthioglycolate, pentaerythritol tetrakisthiopropionate, tris(2-mercaptoethyl)isocyanurate and tris (3-mercaptopropyl)isocyanurate; (vi) aromatic dithiols, e.g., 1,2-benzenedithiol, 1,4-benzenedithiol, 4-methyl-1,2-benzenedithiol, 4-butyl-1,2-benzenedithiol and 4-chloro-1,2- benzenedithiol; and (vii) high-molecular-weight compounds containing mercapto group, e.g., modified polyvinyl alcohol containing mercapto group. These compounds may be used either individually or in combination;

(c) compounds containing amino group: (i) aliphatic or aromatic amine-containing compounds, e.g., ammonia, methylamine, ethylamine, n-propylamine, isopropylamine, monoethanolamine, n-propanolamine, isopropanolamine, aniline, cyclohexylamine, n-butylamine, n-pentylamine, n-hexylamine, n-heptylamine, n-octylamine, n-nonylamine, n-decylamine, n-undecylamine, n-dodecylamine, n-tridecylamine, n-tetradecylamine, n-pentadecylamine, n-hexadecylamine, n-heptadecylamine, n-octadecylamine, n-eicosylamine, aminomethyltrimethylsilane, aminomethyltriethylsilane, aminomethyltripropylsilane, aminoethyltrimethylsilane, aminoethyltriethylsilane, aminoethyltripropylsilane, aminopropyltrimethylsilane, aminopropyltriethylsilane, aminopropyltripropylsilane, aminomethyltrimethoxysilane, aminomethyltriethoxysilane, aminomethyltripropoxysilane, aminomethyldimethoxymethylsilane, aminomethylmethoxydimethylsilane, aminomethyldiethoxymethylsilane, aminomethylethoxydimethylsilane, aminomethyldimethoxyethylsilane, aminomethylmethoxydiethylsilane, aminomethyldiethoxyethylsilane, aminomethylethoxydiethylsilane, aminoethyldimethoxymethylsilane, aminoethylmethoxydimethylsilane, aminoethyldiethoxymethylsilane, aminoethylethoxydimethylsilane, aminoethyldimethoxyethylsilane, aminoethylmethoxydiethylsilane, aminoethyldiethoxyethylsilane, aminoethylethoxydiethylsilane, aminopropyldimethoxymethylsilane, aminopropylmethoxydimethylsilane, aminopropyldiethoxymethylsilane, aminopropylethoxydimethylsilane, aminopropyldimethoxyethylsilane, aminopropylmethoxydiethylsilane, amiopropyldiethoxyethylsilane, aminopropylethoxydiethylsilane, aminomethylphenyldimethylsilane, diethylamine, diethanolamine, di-n-propanolamine, di-isopropanolamine, N-methylethanolanmine and N-ethylethanolamine; (ii) alkylamino acrylates, e.g., dimethylaminoethyl acrylate, diethylaminoethyl acrylate, dimethylaminomethyl acrylate, diethylaminomethyl acrylate, adduct of diacrylate and diethylamine, and adduct of trimethylolpropane triacrylate and diethylamine; (iii) alkylaminoalkylvinyl ethers, e.g., (meth)acrylamide, α-ethyl (meth)acrylamide, N-methyl(meth)acrylamide, N-butoxymethyl (meth)acrylamide, diacetone(meth)acrylamide, N,N-dimethyl(meth)acrylamide, N,N-diethyl(meth)acrylamide, N,N-dimethyl-p-styrenesulfoamide, N,N-dimethylaminoethyl(meth)acrylate, N,N-diethylaminoethyl(meth)acrylate, N,N-dimethylaminopropyl(meth)acrylate, N,N-diethylaminopropyl(meth)acrylate, N-[2-(meth)acryloyloxyethyl]piperidine, N-[2-(meth)acryloyloxyethyl]pyrrolidine, N-[2-(meth)acryloyloxyethyl]morpholine, 4-(N,N-dimethylamino)styrene, 4-(N,N-diethylamino)styrene, 4-vinyl pyridine, 2-dimethylaminoethylvinyl ether, 2-diethylaminoethylvinyl ether, 4-dimethylaminobutylvinyl ether, 4-diethylaminobutylvinyl ether and 6-dimethylaminohexylvinyl ether; and (iv) high-molecular-weight compounds containing amino group. These compounds may be used either individually or in combination;

(d) compounds containing carboxyl group: (i) saturated aliphatic monocarboxylates, e.g., formic, acetic, propionic, isovaleric and hexanoic acid; (ii) saturated aliphatic dicarboxylates, e.g., oxalic, malonic and succinic acid; (iii) organic carboxylic acids having ester group, e.g., 2-acryloyloxyethylsuccinic and 3-acryloyloxypropylphthalic acid; (iv) carbocyclic carboxylic acids, e.g., benzoic, toluyl and salicylic acid; (v) heterocyclic carboxylic acids, e.g., furancarboxylic, thiophenecarboxylic and pyridinecarboxylic acid; (vi) various unsaturated mono- or di-carboxylic or unsaturated dibasic acids, e.g., acrylic, methacrylic, crotonic, itaconic, maleic and fumaric acid, and monobutyl itaconate and monobutyl maleate; (vii) acid anhydrates derived from carboxylic acid, e.g., acetic, succinic and phthalic anhydride; and (viii) high-molecular-weight carboxylic acids, e.g., polyacrylic and polymethacrylic acid. These compounds may be used either individually or in combination;

(e) compounds containing isocyanate group: (i) cyclohexyl isocyanate, n-decyl isocyanate, n-undecyl isocyanate, n-dodecyl isocyanate, n-tridecyl isocyanate, n-tetradecyl isocyanate, n-pentadecyl isocyanate, n-hexadecyl isocyanate, n-heptadecyl isocyanate, n-octadecyl isocyanate, n-eicosyl isocyanate, phenyl isocyanate and naphthyl isocyanate; and (ii) isocyanate compounds having 2 or more isocyanate groups, e.g., those used for carbodiimidated resins. These compounds may be used either individually or in combination; and (f) to (j): compounds having a representative bonding group reactive with an isocyanate group, which can be produced by polymerization of the compound of (a) to (e), respectively, with a varying isocyanate compound under heating in the presence or absence of catalyst.

The representative compounds reactive with an isocyanate group are not limited to those compounds (a) to (j). Any compound may be used, so long as it has a functional group or bond reactive with an isocyanate group (e.g., acid anhydrides and compounds having an unsaturated double bond, and the like). They may be used either individually or in combination.

The carbodiimide resin represented by the chemical formula (1) has average molecular weight of 200 to 50,000, preferably 300 to 20,000, more preferably 400 to 10,000 and most preferably 500 to 5,000.

The isocyanates as the starting compounds for producing the carbodiimide compound (carbodiimide resin) for the present invention include those having per molecule at least 2 isocyanate groups, preferably one or more isocyanates selected from bifunctional isocyanate, hexamethylene diisocyanate (hereinafter sometimes referred to as HDI), hydrogenated xylylene diisocyanate ($H_6XDI$), xylylene diisocyanate (XDI), 2,2,4-trimethylhexamethylene diisocyanate (TMHDI), 1,12-diisocyanatedodecane (DDI), norbornane diisocyanate (NBDI), 4,4'-dicyclohexylmethane diisocyanate (HMDI) and tetramethylxylylene diisocyanate (TMXDI), isophorone diisocyanate (IPDI), 2,4,6-triisopropylphenyl diisocyanate (TIDI), 4,4'-diphenylmethane diisocyanate (MDI), tolylene diisocyanate (TDI) and hydrogenated tolylene diisocyanate (HTDI), among others.

The first step for producing the carbodiimide compound for the present invention is heating the above-described isocyanate in the presence of a carbodiimidation catalyst.

The catalyst useful for the present invention is not limited, so long as it can accelerate the carbodiimidation reaction, but organophosphorus-based compounds are suitable, in particular phospholene oxides for their activity.

More specifically, these phospholene oxides include 3-methyl-1-phenyl-2-phospholene-1-oxide, 3-methyl-1-ethyl-2-phospholene-1-oxide, 1,3-dimethyl-2-phospholene-1-oxide, 1-phenyl-2-phospholene-1-oxide, 1-ethyl-2-phospholene-1-oxide, 1-methyl-2-phospholene-1-oxide and double-bond isomers thereof, of which 3-methyl-1-phenyl-2-phospholene-1-oxide is more suitable for its industrial availability. Timing of incorporation of the carbodiimidation catalyst is not limited, i.e., it may be incorporated before, during or after the isocyanate is heated. It is however preferable to incorporate the catalyst while the reaction system is at relatively low temperature for safety considerations.

The first step for producing the carbodiimide compound for the present invention is heating the above-described isocyanate in the presence of a carbodiimidation catalyst, as described above. The synthesis process may be effected in the presence or absence of a solvent, or a solvent may be added while the reaction process is proceeding. Whether a solvent is used or not, or its addition timing, when used, can be selected depending on specific purposes or objects of the carbodiimide compound.

The specific examples of the solvents useful for the present invention include ketones, e.g., acetone, methylethylketone, methylisobutylketone and cyclohexanone; esters, e.g., ethyl acetate, butyl acetate, ethyl propionate and cellosolve acetate; aliphatic or aromatic hydrocarbons, e.g., pentane, 2-methylbutane, n-hexane, cyclohexane, 2-methylpentane, 2,2-dimethylbutane, 2,3-dimethylbutane, heptane, n-octane, isooctane, 2,2,3-trimethylpentane, decane, nonane, cyclopentane, methylcyclopentane, methylcyclohexane, ethylcyclohexane, p-menthane, benzene, toluene, xylene and ethylbenzene; halogenated hydrocarbons, e.g., carbon tetrachloride, trichloroethylene, chlorobenzene and tetrabromoethane; ethers, e.g., ethyl ether, dimethyl ether, trioxane and tetrahydrofuran; acetals, e.g., methylal and diethyl acetal; and sulfur or nitrogen containing organic compounds, e.g., nitropropene, nitrobenzene, pyridine, dimethylformamide, dimethylsulfoxide and acrylonitrile. The solvent is not limited, so long as it is not harmful to the isocyanate or carbodiimide group during the synthesis process, and can be selected, as required, for a specific purpose of the polymerization process. These solvents may be used either individually or in combination.

The following compounds may be used as diluents, in addition to the above solvents, provided that the carbodiimide resin terminal is sealed with the hydrophilic segment, described later, after completion of the synthesis process: water; alcohols, e.g., methanol, ethanol, 1-propanol, 2-propanol, 1-butanol, 2-butanol, isobutyl alcohol, tert-butyl alcohol, 1-pentanol, 2-pentanol, 3-pentanol, 2-methyl-1-butanol, isopentyl alcohol, tert-pentyl alcohol, 1-hexanol, 2-methyl-1-pentanol, 4-methyl-2-pentanol, 2-ethyl butanol, 1-heptanol, 2-heptanol, 3-heptanol, 2-octanol, 2-ethyl-1-hexanol, benzyl alcohol and cyclohexanol; and ether alcohols, e.g., methyl cellosolve, ethyl cellosolve, isopropyl cellosolve, butyl cellosolve and diethylene glycol monobutyl ether. These may be used either individually or in combination. When used as a diluent, the above compound is preferably used at relatively low temperature, because of high reactivity of the carbodiimide group.

Content of a water-soluble carbodiimide is preferably used as the carbodiimide compound for the present invention, on account of recent environmental considerations.

Such a water-soluble carbodiimide compound has a hydrophilic segment which is represented by, e.g., the chemical formula (1) with $R^1$ or $R^3$ being at least one kind of residue represented by one of the following chemical formulae (2) to (5).

(i) A residue of an alkyl sulfonate salt having at least one reactive hydroxyl group, represented by:

$$R^5—SO_3—R^4—OH \qquad (2)$$

(wherein, $R^4$ is an alkylene group of 1 to 10 carbon atoms; and $R^5$ is an alkali metal).

The alkyl sulfonates salts include sodium hydroxyethanesulfonate and sodium hydroxypropanesulfonate, of which the latter is more preferable.

(ii) A quaternary salt of a dialkylaminoalcohol residue represented by:

$$(R^6)_2—NR'—R^7—OH \qquad (3)$$

(wherein, $R^6$ is a lower alkyl group of 1 to 4 carbon atoms; $R^7$ is an alkylene or oxyalkylene group of 1 to 10 carbon atoms; and R' is a group derived from an agent for producing a quaternary salt).

The dialkylaminoalcohols include 2-dimethylaminoethanol, 2-diethylaminoethanol, 3-dimethylamino-1-propanol, 3-diethylamino-1-propanol, 3-diethylamino-2-propanol, 5-diethylamino-2-propanol and 2-(di-n-butylamino)ethanol, of which 2-dimethylaminoethanol is more preferable.

The agents for producing a quaternary salt include dimethylsulfuric acid and methyl p-toluenesulfonate.

(iii) A quaternary salt of a dialkylaminoalkylamine residue represented by:

$$(R^6)_2—NR'—R^7—NH_2 \qquad (4)$$

(wherein, $R^6$, $R^7$ and R' are each the same as the corresponding one in the formula (3)).

The dialkylaminoalkylamines include 3-dimethylamino-n-propylamine, 3-diethylamino-n-propylamine and 2-(diethylamino)ethylamine, of which 3-dimethylamino-n-propylamine is more preferable.

The agents for producing a quaternary salt include dimethylsulfuric acid and methyl p-toluenesulfonate.

(iv) A poly(alkylene oxide) residue sealed with an alkoxy group at the terminals, having at least one reactive hydroxyl group, represented by:

$$R^8—(O—CHR^9—CH_2)_m—OH \qquad (5)$$

(wherein, $R^8$ is a lower alkyl group of 1 to 4 carbon atoms; $R^9$ is a hydrogen atom or a methyl group; and "m" is an integer of 2 to 30).

The poly(alkylene oxides) include poly(ethylene oxide) monomethyl ether, poly(ethylene oxide)monoethyl ether, poly(ethylene oxide/propylene oxide)monomethyl ether and poly(ethylene oxide/propylene oxide)monoethyl ether, of which poly(ethylene oxide)monomethyl ether is more preferable.

(2) An Epoxy Compound

An epoxy compound relevant to an organic compound (B) of the present invention is not specifically limited as long as it is a compound having an epoxy group, however, such a multi-functional epoxy compound as provides intermolecular crosslinked structure is preferable.

Typical examples of an epoxy compound includes glycidyl ethers prepared by aliphatic polyhydric alcohols such as neopentylglycol diglycidyl ether, 1,6-hexanediol diglycidyl ether, ethyleneglycol diglycidyl ether, propyleneglycol diglycidyl ether, hexamethyleneglycol diglycidyl ether, cyclohexanediol diglycidyl ether, glycerinetriglycidyl ether, trimethylolpropane triglycidyl ether, pentaerythritol tetraglycidyl ether, etc.; polyalkyleneglycol diglycidyl ethers such as polyethyleneglycol diglycidyl ether, polypropyleneglycol diglycidyl ether, polytetramethyleneglycol diglycidyl ether, etc. ; polyester resin based polyglycidyl compounds; polyamide resin based polyglycidyl compounds, bisphenol A based epoxy resins; phenolnovolac based epoxy resins;, epoxyurethane resins; etc.

These compounds may be used either individually or in combination of two or more kinds.

A water-soluble epoxy compound is preferably used as an epoxy compound for the present invention, on account of recent environmental considerations.

Such an epoxy compound typically includes (poly)alkyleneglycol diglycidyl ethers such as (poly)ethyleneglycol diglycidyl ether, (poly)propyleneglycol diglycidyl ether, etc.; polyglycerol polyglycidyl ethers such as glycerol polyglycidyl ether, diglycerol polyglycidyl ether, etc.; water-soluble epoxy compounds such as sorbitol polyglycidyl ether, etc. These compounds may be used either individually or in combination of two or more kinds.

(3) An Amino Compound

An amino compound relevant to an organic compound (B) of the present invention is not specifically limited as long as it is a compound having an amino group, however, such a multi-functional amino compound as provides intermolecular crosslinked structure is preferable.

Typical examples of an epoxy compound includes aliphatic polyfunctional amines, aromatic polyfunctional amines, heterocyclic polyfunctional amines and aminoalkyl heterocyclic polyfunctional amines such as ethylenediamine, diethylenetriamine, 1,4-cyclohexanediamine, isophoronediamine, tolylenediamine, cis-1,3-diaminocyclobutane, piperazine, hexamethylenediamine, m-xylylenediamine, aminoethylpiperazine, etc. A polyfunctional amino polymer includes polyethyleneimine, polyallylamine, polydimethylallylammonium hydroxide or a copolymer thereof with acrylamide and sulfur dioxide, a multi-functional amino copolymer such as chitosan, etc. These compounds may be used either individually or in combination of two or more kinds.

(4) An Oxazoline Compound

An oxazoline compound relevant to an organic compound (B) of the present invention is not specifically limited as long as it is a compound having an oxazoline group (ring), however, such a multi-functional oxazoline compound as provides intermolecular crosslinked structure is preferable.

Typical examples of an oxazoline compound includes bisoxazoline compounds such as 2,2'-bis(2-oxazoline), 2,2'-bis(4-methyl-2-oxazoline), 2,2'-bis(5-methyl-2-oxazoline), 2,2'-bis(5,5'-dimethyloxazoline), 2,2'-bis(4,4,4',4'-tetramethyl-2-oxazoline), 1,2-bis(2-oxazoline-2-yl)ethane, 1,4-bis(2-oxazoline-2-yl)butane, 1,6-bis(2-oxazoline-2-yl)hexane, 1,8-bis(2-oxazoline-2-yl)octane, 1,4-bis(2-oxazoline-2-yl)cyclohexane, 1,2-bis(2-oxazoline-2-yl)benzene, 1,3-bis(2-oxazoline-2-yl)benzene, 1,4-bis(2-oxazoline-2-yl)benzene, 1,2-bis(5-methyl-2-oxazoline-2-yl)benzene, 1,3-bis(5-methyl-2-oxazoline-2-yl)benzene, 1,4-bis(5-methyl-2-oxazoline-2-yl)benzene, 1,4-bis(4,4'-dimethyl-2-oxazoline-2-yl)benzene, etc.; and compounds containing a terminal oxazoline group obtained by a reaction between two chemical equivalents of a oxazoline group of these bisoxazoline compounds and one chemical equivalent of a carboxyl group of multibasic carboxylic acids (such as maleic acid, succinic acid, itaconic acid, phthalic acid, tetrahydrophthalic acid, hexahydrophthalic acid, methylhexahydrophthalic acid, chlorendic acid, trimellitic acid, pyromellitic acid, benzophenonetetracarboxylic acid, etc.).

The oxazoline compound may be a polymerized compound with at least 2 mole more an oxazoline groups in a molecule, obtained by an addition polymerized polymer and the like, without opening an oxazoline ring.

Typical commercial products include "EPOCROS™" (from Nippon Shokubai Co., Ltd.), WS-500, WS-700, K-1010E, K-2010E, K-1020E, K-2020E, K-1030E, K-2030E, RPS-1005, etc.

These compounds may be used either individually or in combination of two or more kinds.

A water-soluble oxazoline compound is preferably used as an oxazoline compound for the present invention, on account of recent environmental considerations.

Such an oxazoline compound typically includes a water-soluble oxazoline compound "EPOCROS™" (from Nippon Shokubai Co., Ltd.), WS-500, WS-700, etc.

As for these organic compounds (B), the above-described carbodiimide compound, epoxy compound, amino compound and oxazoline compound may be used either individually or in combination of two or more kinds.

A carbodiimide compound and oxazoline compound are preferable due to easy reaction with a functional group without using a catalyst, etc.

3. A Base Particle (A) with a Functional Group and a Method for Producing the Same The processes for producing the base particle (A) with a functional group for the present invention include those for producing a thermoplastic resin having a functional group reactive with an organic compound (B) (e.g., activated hydrogen group, an epoxy group, and the like) with an organic compound (B) and particles thereof. More specifically, they include:

(1) A process for producing a particle by dropping, crushing and classifying a resin obtained by a general mass or solution polymerization.

(2) A process for producing a (spherical) particle by emulsion or suspension polymerization effected in an aqueous solution.

(3) A process for producing a (spherical) particle by the above processes (1) and (2) combined with a seed process or the like.

(4) A process for producing a (spherical) particle by dispersion polymerization in a non-aqueous solvent or a water-mixed solvent.

(5) A process for producing a resin and a (spherical) particle by the above process (4) combined with a seed process or the like.

The processes for the present invention are not limited to the above, and any process may be used so long as it produces a composition and a particle thereof which satisfy the necessary conditions, e.g., quantity of a functional group in a base particle (A), resin and particle size, and the like.

In the process for producing the base particle (A) having a functional group, the particle produced by one of the above polymerization processes may have small quantity of crosslinked structure beforehand within the range not to provide bad effects, and can be used for producing a flat particle of the present invention.

The base particle (A) for the present invention is the one having a functional group reactive with an organic compound (B), typically including a hydroxyl group, a carboxyl group, an amino group, a thiol group, an epoxy group, etc. A particularly preferable functional group is an activated hydrogen group and at least one functional group selected from a hydroxyl group, a carboxyl group, an amino group or a thiol group.

The base particle of a thermoplastic resin has weight-average molecular weight of around 1,000 to 3,000,000, or when it is spherical, about 3,000 to 500,000, preferably 5,000 to 100,000.

The thermoplastic resin is one of styrene-based polymer, (meth)acryl-based polymer, a copolymer produced by addition polymerization with other vinyl-based polymer, a polymer produced by hydrogen transfer polymerization, a polymer produced by polycondensation and a polymer produced by addition condensation and preferably a polymer derived from an unsaturated double bond.

The specific examples of the representative starting copolymerizable monomers as the main component for the above polymer include (i) styrenes, e.g., styrene, o-methyl styrene, m-methyl styrene, p-methyl styrene, α-methyl styrene, p-ethyl styrene, 2,4-dimethyl styrene, p-n-butyl styrene, p-tert-butyl styrene, p-n-hexyl styrene, p-n-octyl styrene, p-n-nonyl styrene, p-n-decyl styrene, p-n-dodecyl styrene, p-methoxystyrene, p-phenyl styrene, p-chlorostyrene and 3,4-dichlorostyrene; (ii) (meth)acrylate esters, e.g., methyl acrylate, ethyl acrylate, n-butyl acrylate, isobutyl acrylate, propyl acrylate, hexyl acrylate, 2-ethylhexyl acrylate, n-octyl acrylate, dodecyl acrylate, lauryl acrylate, stearyl acrylate, 2-chloroethyl acrylate phenyl, methyl α-chloroacrylate, methyl methacrylate, ethyl methacrylate, n-butyl methacrylate, isobutyl methacrylate, propyl methacrylate, hexyl methacrylate, 2-ethylhexyl methacrylate, n-octyl methacrylate, dodecyl methacrylate, lauryl methacrylate and stearyl methacrylate; (iii) vinyl esters, e.g., vinyl acetate, vinyl propionate, vinyl benzoate and vinyl butyrate; (iv) (meth) acrylic acid derivatives, e.g., acrylonitrile and methacrylonitrile; (v) vinyl ethers, e.g., vinyl methyl ether, vinyl ethyl ether and vinyl isobutyl ether; (vi) vinyl ketones, e.g., vinyl methylketone, vinyl hexylketone and methylisopropenylketone; (vii) N-vinyl compounds, e.g., N-vinyl pyrrole, N-vinyl carbazole, N-vinyl indole and N-vinyl pyrrolidone; and (viii) (meth)acrylate esters having a fluoroalkyl group, e.g., vinyl fluoride, vinylidene fluoride, tetrafluoroethylene, hexafluoropropylene, trifluoroethyl acrylate and tetrafluoropropyl acrylate. These compounds may be used either individually or in combination of two or more kinds.

The specific examples of the representative radical-polymerizable monomers or compounds having a carboxyl group as the functional group reactive with an organic compound (B) include various unsaturated mono- and di-carboxylic acids and unsaturated dibasic acids, e.g., acrylic, methacrylic, crotonic, itaconic, maleic and fumaric acid, and monobutyl itaconate and monobutyl maleate. These compounds may be used either individually or in combination of two or more kinds.

The specific examples of the representative radical-polymerizable monomers having a hydroxyl group as the functional group reactive with an organic compound (B) include (meth)acrylate-based monomers, e.g., 2-hydroxyethyl (meth)acrylate, 2-hydroxypropyl(meth)acrylate, 3-hydroxypropyl(meth)acrylate and 4-hydroxybutyl(meth)acrylate; polyalkylene glycol(meth)acrylate-based compounds, e.g., polyethylene glycol mono(meth)acrylate and polypropylene glycol mono(meth)acrylate; various types of hydroxyalkyl vinyl ethers, e.g., hydroxyethyl vinyl ether and hydroxybutyl vinyl ether; and various allyl compounds, e.g., allyl alcohol and 2-hydroxyethyl allyl ether. These compounds may be used either individually or in combination of two or more kinds.

The specific examples of the representative polymers having a hydroxyl group include thermoplastic resins having hydroxyl group, e.g., totally or partially saponified resins (e.g., polyvinyl alcohol (PVA)), and saponified resins (e.g., polymer having acetate esters composed of a copolymer of vinyl acetate and another vinyl monomer). These polymers are also useful for the present invention.

The specific examples of the representative radical-polymerizable monomers or compounds having an amino group as the functional group reactive with an organic compound (B) include (meth)acrylamide, α-ethyl(meth)acrylamide, N-methyl(meth)acrylamide, N-butoxymethyl(meth)acrylamide, diacetone(meth)acrylamide, N,N-dimethyl(meth) acrylamide, N,N-diethyl(meth)acrylamide, N,N-dimethyl-p-styrenesulfoamide, N,N-dimethylaminoethyl(meth)acrylate, N,N-diethylaminoethyl(meth)acrylate, N,N-dimethylaminopropyl(meth)acrylate, N,N-diethylaminopropyl(meth)acrylate, N-[2-(meth)acryloyloxyethyl]piperidine, N-[2-(meth) acryloyloxyethyl]pyrrolidine, N-[2-(meth)acryloyloxyethyl] morpholine, 4-(N,N-dimethylamino)styrene, 4-(N,N-diethylamino)styrene, 4-vinyl pyridine, 2-dimethylaminoethyl vinyl ether, 2-diethylaminoethyl vinyl ether, 4-dimethylaminobutyl vinyl ether, 4-diethylaminobutyl vinyl ether and 6-dimethylaminohexyl vinyl ether. These compounds may be used either individually or in combination of two or more kinds.

The specific examples of the representative radical-polymerizable monomers or compounds having a thiol(mercapto) group as the functional group reactive with an organic compound (B) include those having an unsaturated double bond, e.g., 2-propene-1-thiol, 3-butene-1-thiol, 4-pentene-1-thiol, 2-mercaptoethyl(meth)acrylate, 2-mercapto-1-carboxyethyl(meth)acrylate, N-(2-mercaptoethyl)acrylamide, N-(2-mercapto-1-carboxyethyl)acrylamide, N-(2-mercaptoethyl)methacrylamide, N-(4-mercaptophenyl)acrylamide, N-(7-mercaptonaphthyl)acrylamide and mono-2-mercaptoethylamide maleate; and compounds having a crosslinked structure between a compound having at least 2 functional groups and monomer having a group reactive with thiol (mercapto) group and —C═C— double bond (e.g., tetramethylenedithiol, hexamethylenedithiol, octamethylenedithiol or decamethylenedithiol). These compounds may be used either individually or in combination of two or more kinds. Thermoplastic resins having a thiol(mercapto) group, e.g., modified polyvinyl alcohol having a thiol(mercapto) group, are also useful for the present invention.

Radical-polymerizable monomers or compounds having an epoxy group as the functional group reactive with an organic compound (B) may also be used and typically include epoxy group containing monomers such as glycidyl (meth)acrylate, (β-methyl)glycidyl(meth)acrylate, 3,4-epoxycyclohexyl(meth)acrylate, allylglycidyl ether, 3,4-epoxyvinylcyclohexane, di(β-methyl)glycidyl maleate, di(β-methyl)glycidyl fumarate, etc.; aliphatic polyhydric alcohol glycidyl ether such as ethyleneglycol diglycidyl ether, propyleneglycol diglycidyl ether, hexamethyleneglycol diglycidyl ether, cyclohexanediol diglycidyl ether, glycerine triglycidyl ether, trimethylolpropane triglycidyl ether, pentaerythritol tetraglycidyl ether, etc.; polyalkyleneglycol glycidyl ether such as polyethyleneglycol diglycidyl ether, polypropyleneglycol diglycidyl ether, polytetramethyleneglycol diglycidyl ether, etc.; polyester resin based polyglycidyl ethers; polyamide resin based polyglycidyl ethers; bisphenol A based epoxy resins; phenolnovolac based epoxy resins;, epoxyurethane resin; etc.

These compounds may be used either individually or in combination of two or more kinds.

A water-soluble epoxy compound is preferably used as an epoxy compound for the present invention, on account of recent environmental considerations.

Typical examples of water-soluble epoxy compounds include (poly)alkyleneglycol diglycidyl ether such as (poly)ethyleneglycol diglycidyl ether, (poly)propyleneglycol diglycidyl ether, etc.; (poly)glycerol polyglycidyl ethers such as glycerol polyglycidyl ether, diglycerol polyglycidyl ether, etc.; water soluble epoxy compounds such as sorbitol polyglycidyl ether; etc. These compounds may be used either individually or in combination of two or more kinds.

When two or more functional groups, e.g., carboxyl, hydroxyl, amino or thiol(mercapto), epoxy groups, are to be incorporated into a copolymer, the above-described monomers having a varying reactive group may be combined with each other to produce a multi-functional copolymer. Moreover, multi-functional resin particles containing an organic compound (B) can be produced by adjusting content of the organic compound (B), reaction temperature or other conditions.

For radical polymerization to produce a base particle (A) for the present invention, a known radical polymerization initiator may be used.

The specific examples of the representative radical polymerization initiators include peroxides, e.g., benzoyl peroxide, cumene hydroperoxide, t-butyl hydroperoxide; persulfates, e.g., sodium persulfate and ammonium persulfate; and azo-based compounds, e.g., azobisisobutylonitrile, azobismethylbutylonitrile and azobisisovaleronitrile. These compounds may be used either individually or in combination of two or more kinds.

When a particle reactive with an organic compound (B) is to be produced, various synthesis/polymerization processes described above may be employed; including synthesis in a medium such as solution polymerization (including emulsion polymerization, suspension polymerization and dispersion polymerization), etc.

The specific examples of the representative polymerization solvents include water; alcohols, e.g., methanol, ethanol, 1-propanol, 2-propanol, 1-butanol, 2-butanol, isobutyl alcohol, tert-butyl alcohol, 1-pentanol, 2-pentanol, 3-pentanol, 2-methyl-1-butanol, isopentyl alcohol, tert-pentyl alcohol, 1-hexanol, 2-methyl-1-pentanol, 4-methyl-2-pentanol, 2-ethyl butanol, 1-heptanol, 2-heptanol, 3-heptanol, 2-octanol, 2-ethyl-1-hexanol, benzyl alcohol and cyclohexanol; and ether alcohols, e.g., methyl cellosolve, ethyl cellosolve, isopropyl cellosolve, butyl cellosolve, and diethylene glycol monobutyl ether; ketones, e.g., acetone, methylethylketone, methylisobutylketone and cyclohexanone; esters, e.g., ethyl acetate, butyl acetate, ethyl propionate and cellosolve acetate; aliphatic or aromatic hydrocarbons, e.g., pentane, 2-methylbutane, n-hexane, cyclohexane, 2-methylpentane, 2,2-dimethylbutane, 2,3-dimethylbutane, heptane, n-octane, isooctane, 2,2,3-trimethylpentane, decane, nonane, cyclopentane, methylcyclopentane, methylcyclohexane, ethylcyclohexane, p-menthane, dicyclohexane, benzene, toluene, xylene and ethylbenzene; halogenated hydrocarbons, e.g., carbon tetrachloride, trichloroethylene, chlorobenzene and tetrabromoethane; ethers, e.g., ethyl ether, dimethyl ether, trioxane and tetrahydrofuran; acetals, e.g., methylal and diethyl acetal; fatty acids, e.g., formic, acetic and propionic acid; and sulfur- or nitrogen containing organic compounds, e.g., nitropropene, nitrobenzene, dimethyl amine, monoethanolamine, pyridine, dimethylformamide and dimethylsulfoxide. The solvent is not limited, and can be selected as long as it does not dissolve a base particle (A) but dissolves an organic compound, as required, for a specific purpose of the polymerization process. These solvents may be used either individually or in combination of two or more kinds.

A specific polymerization may incorporate, as required, one or more additives, e.g., (polymer) dispersants, stabilizers, emulsifiers and surfactants, for production of the particles.

The specific examples of the representative additives are cited. The dispersants and stabilizers include various hydrophilic and hydrophobic ones, such as polystyrene derivatives, e.g., polyhydroxystyrene, polystyrenesulfonic acid, vinyl phenol/(meth)acrylate ester copolymer, styrene/(meth)acrylate ester copolymer and styrene/vinyl phenol/(meth)acrylate ester copolymer; poly(meth)acrylic acid and derivatives thereof, e.g., poly(meth)acrylic acid, poly(meth)acrylamide, polyacrylonitrile, polyethyl(meth)acrylate and polybutyl(meth)acrylate; polyvinyl alkyl ether derivatives, e.g., polymethyl vinyl ether, polyethyl vinyl ether, polybutyl vinyl ether and polyisobutyl vinyl ether; cellulose and derivatives thereof, e.g., cellulose, methyl cellulose, cellulose acetate, cellulose nitrate, hydroxymethyl cellulose, hydroxyethyl cellulose, hydroxypropyl cellulose and carboxymethyl cellulose; polyvinyl acetate and derivatives thereof e.g., polyvinyl alcohol, polyvinyl butyral, polyvinyl formal, and polyvinyl acetate; nitrogen-containing polymer derivatives, e.g., polyvinyl pyridine, polyvinyl pyrrolidone, polyethyleneimine and poly-2-methyl-2-oxazoline; halogenated polyvinyl derivatives, e.g., polyvinyl chloride and polyvinylidene chloride; and polysiloxane derivatives, e.g., polydimethyl siloxane. These may be used either individually or in combination of two or more kinds.

The emulsifiers (surfactants) useful for the present invention include anionic emulsifiers, including alkyl sulfate ester salts, e.g., sodium lauryl sulfate, alkyl benzenesulfonates, e.g., sodium dodecylbenzenesulfonate, alkylnaphthalenesulfonates, fatty acid salts, alkyl phosphates, and alkylsulfosuccinates; cationic emulsifiers, including alkylamine salts, quarternary ammonium salts, alkyl betaine, and amine oxide; nonionic emulsifiers, including polyoxyethylene alkyl ether, polyoxyethylene alkyl allyl ether, polyoxyethylene alkyl phenyl ether, sorbitan fatty acid ester, glycerin fatty acid ester and polyoxyethylene fatty acid ester. These may be used either individually or in combination of two or more kinds.

4. A Process for Producing a Flat Particle

A flat particle of the present invention is produced first by producing a base particle (A) having a functional group reactive with an organic compound (B), and reacting the particle with the organic compound (B) at controlled temperature in the presence of a solvent which dissolves the organic compound (B) but not dissolve said base particle (A), to obtain a flat particle. A flat particle with at least one mechanical and functional characteristics such as adhesion, glueability, tackiness, dispersibility in a solvent, and the like can be obtained by further adhering the organic compound (B) bonded at the surface derived from the base particle (A), at the surface layer of the flat particle, depending on applications. More specifically, the process is characterized by consisting of three steps: the first step in which the base particle (A) having the functional group is mixed with the organic compound (B) in the presence of at least one kind of a solvent which dissolves (B) but not (A); and the subsequent second step in which the base particle (A) having the functional group but not containing a monomer with an unsaturated double bond and the organic compound (B) are heated to bond and make crosslinked structure: and further the third step in which pure particle is obtained by removing a solvent from a particle solution obtained. This produces a flat particle having an organic compound bonded to a base particle (A).

A bond obtained from a base particle (A) and an organic compound (B) includes a bond group obtained by chemical reaction among functional groups or reactive groups (typically such as a hydroxyl group, a carboxyl group, an amino group, a thiol group, an epoxy group, an isocyanate group, a carbodiimide group, an oxazoline group, and the like), contained by the base particle (A) and the organic compound (B).

Typical examples of possible bond by such chemical reactions include an isourea bond, a guanidine bond, a carbamoylamide bond, a thiourea bond, an acylurea bond, an amide bond, a bond by esterification, a bond by amide esterification, a bond by etherification, a bond by secondary amination or tert-amination, a bond by epoxy ring opening or oxazoline ring opening; etc.

In particular, a base particle (A) having a carboxyl group, a hydroxyl group, an amino group and a thiol group, and a carbodiimide compound having a carbodiimide group is preferable due to providing a firm bond group by relatively easy reaction.

Typical bond examples include:

1) an isourea bond for a carbodiimide group and a hydroxyl group

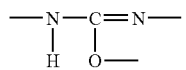

2) a guanidine bond for a carbodiimide group and an amino group

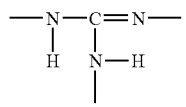

3) a carbamoylamide bond for a carbodiimide group and a carboxyl group

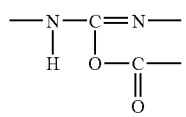

4) a thiourea bond for a carbodiimide group and a thiol group

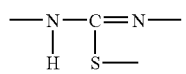

Further, other fine particles can be selected as appropriate and physically or chemically added to a flat particle. Typical methods include:

1) to incorporate fine particles during bonding between a base particle (A) and an organic compound (B).
2) to add to a base particle (A) or after producing a flat particle using polarity.
3) to add by chemical bond such as addition polymerization, polycondensation, addition condensation, etc.

The typical fine particle is not specifically limited to an organic particle or an inorganic particle, as long as it is smaller than a base particle, and preferable particle diameter is about 0.01 to 100 μm, further preferably 0.05 to 10 μm. An organic fine particle includes one having an organic component possible to be the above-described base particle (A) or organic dyes, etc. Whereas, an inorganic particle includes inorganic particles such as copper powder, iron powder, gold powder, aluminum oxide, titanium oxide, zinc oxide, silicon oxide, tin oxide, copper oxide, iron oxide, magnesium oxide, manganese oxide, aluminum hydroxide, magnesium hydroxide, inorganic pigment, etc. When a flat particle is used in optical applications, it is preferable to use a metal oxide particle with diameter of 0.01 to 10 μm to attain control of refractivity and improvement of light diffusion property and, among others, titanium oxide, zinc oxide, silicon oxide, etc. are preferable. These particles may be used either individually or in combination of two or more kinds.

The first step may incorporate, as required, adequate additives, e.g., dispersants, antioxidants, stabilizers or emulsifiers, in addition to the base particle (A) and the organic compound (B).

The specific examples of the representative dispersants, stabilizers and emulsifiers are similar to those described earlier. On the other hand, the antioxidants include those based on phenol, sulfur, phosphorus, amine, hydroquinone and hydroxylamine. These may be used either individually or in combination of two or more kinds.

The first or the second step may incorporate, as required, an adequate catalyst depending on a functional group of a base particle (A) and a reactive group of an organic compound (B).

For example, when an epoxy group is included at least in one of the functional group of the base particle (A) and the reactive group of the organic compound (B), a catalyst to be added include tert-amines such as benzyldimethylamine, triethylamine, tributylamine, pyridine, triphenylamine, etc.; quaternary ammonium compounds such as triethylbenzylammonium chloride, tetramethylammonium chloride, etc.; phosphine compounds such as triphenylphosphine, tricyclophosphine, etc.; phosphonium compounds such as benzyltrimethylphosphonium, etc.; imidazole compounds such as 2-methylimidazole, 2-methyl-4-ethylimidazole, etc.; alkaline metal hydroxide such as potassium hydroxide, sodium hydroxide, lithium hydroxide, etc.; alkaline metal carbonates such as sodium carbonate, lithium carbonate, etc.; alkaline metal salts of organic acids; halogenated catalysts having Lewis acidic property or complexes thereof such as boron trichloride, boron trifluoride, tin tetrachloride, titanium tetrachloride; etc. These may be used either individually or in combination of two or more kinds.

Further in the third step to remove a solution (solvent), known technique such as (suction) filtration, vacuum drying, spray drying, and the like may be used, wherein a washing step is incorporated in advance or solution (solvent) type may be changed as appropriate. Degree of flatness can be changed depending on solution (solvent) type.

As for formation mechanism and a preparation method for a flat particle, in general, such a cycle is considered to generate as increase in polymerization rate in crosslinking reaction, increase in crosslinking density and shrinkage by polymerization and enhancement of layer separation generates, which contributes to prepare a flat particle (see "Fine Particle Engineering Series" vol. 2; published by Fuji Technosystem).

As for a preparation method for a similar hollow polymer particle, a core swelling method, a polymerization contraction method, and the like are known, however, whether these mechanisms are completely applied to a flat particle of the present invention or not is not clear at the present stage. However, the present inventors estimate that formation mechanism of a flat particle of the present invention is a composite one of each of these mechanisms and methods.

It is important that at least a surface layer of a base particle (A) is adequately crosslinked to obtain a flat particle of the present invention. Too much crosslinking to inside of a base particle (A) provides a hardened particle and not a flat particle. While, too thick or too thin crosslinked layer at the surface of a base particle (A) may not provide a good flat particle.

Therefore, it is preferable to adjust functional group content of a base particle (A) and reactive group content of an organic compound (B), responsive to types of a reactive group and a functional group.

Typically the following range of adjustment will provide an objective flat particle.

To prepare, from a base particle (A), a flat particle furnished with an organic compound to a surface or inside of a flat surface, required reactive group content of the organic compound (B) is 50 to 1,000 reactive group equivalents, preferably 80 to 800, further preferably 100 to 500 and most preferably 150 to 400. Reactive group equivalents of the organic compound (B) over 1,000 reduces crosslinking degree and does not provide a flat particle, while reactive group equivalents less than 50 increases crosslink density too high and may not provide a flat particle.

To prepare a flat particle with an organic compound layer formed at a surface or inside of a flat particle, content of a required functional group of the base particle (A), reactive with a reactive group of the organic compound (B) is suitably 50 to 700 functional group equivalents, preferably 80 to 500, further preferably 100 to 500 and most preferably 200 to 400. Functional group equivalents less than 50 increases crosslink density too high and may not provide a flat particle, while functional group equivalents over 700 reduces bond content of the organic compound and does not provide a flat particle. Too high crosslink degree with the organic compound (B) also provides a hardened particle and does not provide a flat particle.

When the organic compound (B) is easily impregnates into inside of a particle, crosslinking and bonding can be executed mainly at the surface layer of the base particle (A), by changing a solvent as appropriate to one with low affinity with the base particle (A) (for example, water, water/organic solvent mixture, non-polar solvent, and the like for a polystyrenic particle).

Insufficient adjustment of functional group equivalents of these base particles (A), reactive group equivalents of an organic compound (B), solvent type, temperature, and the like provides monodispersed particles which may be non-flat, hardened, multiply holed, porous with concave part, etc.

The addition amount of an organic compound (B) depends on crosslink amount and an organic compound formable at the surface of a base particle (A), however, it is suitably 0.1 to 8 equivalents based on 1 functional group equivalent of the base particle, preferably 0.3 to 5, further preferably 0.5 to 4 and most preferably 1 to 3. The addition of equivalents over 8 increases crosslink degree and may not provide a flat particle.

To obtain a flat particle, reaction temperature sufficient to form a bond between a base particle (A) and an organic compound (B) may be any temperature not lower than minimum temperature for a chemical reaction between them and depends on types of a functional group of a base particle, type of an organic compound, a solvent, and the like, however, it is suitably in the range of 10 to 200° C., preferably 15 to 150° C., further preferably 20 to 130° C. and most preferably 40 to 100° C.

Reaction time required to bond a functional group of a base particle (A) and an organic compound (B) may be any period sufficient to nearly complete the crosslinking reaction to obtain an objective flat particle and depends largely on an organic compound used and the addition amount thereof, type of a functional group in a particle, solution viscosity and concentration, temperature, and the like, however, suitably is about 1 to 12 hours, preferably 1 to 6 hours and further preferably 2 to 5 hours.

Too longer reaction time makes an organic compound impregnated inside a base particle (A) to harden and may not provide a flat particle. That is, it is important to adjust temperature or reaction time to a degree not to completely harden a particle.

A particle having a functional group may be any type without limitation as long as it contains a functional group such as an activated hydrogen group (a hydroxyl group, a carboxyl group, an amino group, a thiol group,) or an epoxy group reactive with an organic compound (B) and, among others, a particle with a carboxyl group, a hydroxyl group and an amino group is preferable.

Shape of a particle with a functional group is preferably true sphere or nearly sphere. However, non-spherical ones are acceptable.

The base particle (A) suitably have diameter of 0.01 to 300 µm, preferably 0.1 to 100 µm, still more preferably 0.2 to 50 µm and most preferably 0.3 to 25 µm.

A flat particle obtainable in the above-described range preferably has flat surface diameter (particle diameter) D in the range of from 0.015 to 320 µm, preferably from 0.15 to 110 µm, further preferably from 0.25 to 55 µm and most preferably from 0.35 to 27 µm.

Further, a flat particle has ratio between flat surface diameter D and particle thickness d, (D/d), in the range of from 1.0 to 5.0.

Concave part diameter L is smaller than flat surface diameter D obtained.

The solvent which dissolves an organic compound (B) but not a base particle (A) is at least one kind of solvent selected from water and organic solvents. It may be adequately selected in consideration of type and content of the organic compound (B) used, type of the thermoplastic resin (particle) and type of the functional group it contains, application purpose, and so on.

The specific examples of the representative solvents include water; alcohols, e.g., methanol, ethanol, 1-propanol, 2-propanol, 1-butanol, 2-butanol, isobutyl alcohol, tert-butyl alcohol, 1-pentanol, 2-pentanol, 3-pentanol, 2-methyl-1-butanol, isopentyl alcohol, tert-pentyl alcohol, 1-hexanol, 2-methyl-1-pentanol, 4-methyl-2-pentanol, 2-ethyl butanol, 1-heptanol, 2-heptanol, 3-heptanol, 2-octanol, 2-ethyl-1-hexanol, benzyl alcohol and cyclohexanol; and ether alcohols, e.g., methyl cellosolve, ethyl cellosolve, isopropyl cellosolve, butyl cellosolve, and diethylene glycol monobutyl ether; ketones, e.g., acetone, methylethylketone, methylisobutylketone and cyclohexanone; esters, e.g., ethyl acetate, butyl acetate, ethyl propionate and cellosolve acetate; aliphatic or aromatic hydrocarbons, e.g., pentane, 2-methylbutane, n-hexane, cyclohexane, 2-methylpentane, 2,2-dimethylbutane, 2,3-dimethylbutane, heptane, n-octane, isooctane, 2,2,3-trimethylpentane, decane, nonane, cyclopentane, methylcyclopentane, methylcyclohexane, ethylcyclohexane, p-menthane, dicyclohexane, benzene, toluene, xylene and ethylbenzene; halogenated hydrocarbons, e.g., carbon tetrachloride, trichloroethylene, chlorobenzene and tetrabromoethane; ethers, e.g., ethyl ether, dimethyl ether, trioxane and tetrahydrofuran; acetals, e.g., methylal and diethyl acetal; fatty acids, e.g., formic, acetic and propionic acid; and sulfur- or nitrogen containing organic compounds, e.g., nitropropene, nitrobenzene, dimethyl amine, monoethanolamine, pyridine, dimethylformamide, dimethylsulfoxide and acetonitrile. The more preferable solvents are water, a mixture of water and alcohols, a mixture of water and hydrophilic organic solvents, toluene, etc. The solvent is not limited, and can be selected, as required, for a specific purpose of applications. These solvents may be used either individually or in combination of two or more kinds.

A base particle (A) and an organic compound (B) can be prepared using known technique, however, a commercial product may be used instead, if available.

Solution concentration in a curing reaction to form a flat particle is expressed by the following equation and is in the range from 1 to 60% by weight, preferably from 3 to 50% by weight, further preferably from 5 to 40% by weight and most preferably from 6 to 30% by weight.

Solution concentration (% by weight)=100×(total solution−solvent)/total solution In the present description, particle morphology was observed by a photograph in magnification (from 50 to 10,000 times) sufficient to measure such morphology with scanning electron microscope (S-2150 model from Hitachi Co.)

Flat surface diameter D, particle thickness d and concave part diameter L were measured randomly n1=500 times per particle to determine average flat surface diameter (D'), average particle thickness (d') and average concave part diameter (L'). Next, average ratio (P) between average flat surface diameter (D') and average particle thickness (d') was determined by the following equation:

Average ratio (P)=average flat surface diameter (D')/average particle thickness (d')

A particle furnished with mechanical and functional characteristics and having an organic compound at a flat particle surface of the present invention is produced by mixing and bonding a particle having a group reactive with the organic compound (e.g., hydroxyl, amino, carboxyl, thiol, epoxy groups, and the like) with the organic compound, in the presence of at least one kind of a solvent selected from water or an organic solvent which dissolves the organic compound but not the particle. Thus obtained particle shows performance effects of hiding power, whiteness, light diffusion property and smoothness as a flat particle, improved resistance to heat and solvents as a crosslinked particle, and excellent adhesion, glueability, tackiness, and the like as a flat particle having an organic compound.

Moreover, use of a carbodiimide compound as an organic compound improves particle dispersibility, and allows a dye and pigment having a reactive group to react with the carbodiimide to produce fast color.

A flat particle retains mechanical and functional characteristics, along with hiding power, whiteness, light diffusion property and smoothness specific to a flat particle and thus it can be applied to various fields such as static charge developers, paints, coating agents for paper coating or coating on information recording paper, and the like, adhesives, tackifiers, light diffusion agents, materials for automobile and electric/electronic industries, perfuming agents, cosmetics, medicines, pesticides, building materials, and the like.

Moreover, a flat particle can be obtained with an organic compound solution, allowing the unreacted, residual organic compound to be reused repeatedly. These features make the process more economically advantageous.

EXAMPLES

The present invention is described in more detail by SYNTHESIS EXAMPLES of an organic compound and a particle and EXAMPLES, which by no means limit the present invention, wherein "part(s)" and "water" mean part(s) by weight and distilled water, respectively, unless otherwise stated.

[Synthesis of Carbodiimide Resins]

Synthesis Example 1

A mixture of 800 g of 4,4'-dicyclohexylmethane diisocyanate (HMDI) and 4 g of a carbodiimidation catalyst was reacted at 180° C. for 37 hours to produce 4,4'-dicyclohexylmethane carbodiimide with an isocyanate group at the terminal (degree of polymerization: 10.5). Then, 677.3 g of thus obtained carbodiimide was reacted with 297.4 g of polyoxyethylenemonomethyl ether (degree of polymerization m=12) at 140° C. for 6 hours, to which 649.8 g of distilled water was gradually added to produce a pale yellow transparent carbodiimide resin solution (resin concentration: 60% by weight). It contained the carbodiimide at 350/NCN equivalents.

Synthesis Example 2

A mixture of 800 g of 4,4'-dicyclohexylmethane diisocyanate (HMDI) and 4 g of a carbodiimidation catalyst was reacted at 180° C. for 9 hours to produce 4,4'-dicyclohexylmethane carbodiimide with an isocyanate group at the terminal (degree of polymerization: 2.7). Then, 702 g of thus obtained carbodiimide was reacted with 343.3 g of polyoxyethylenemonomethyl ether (degree of polymerization m=4) at 140° C. for 6 hours, to which 696.9 g of distilled water was gradually added to produce a pale yellow transparent carbodiimide resin solution (resin concentration: 60% by weight). It contained the carbodiimide at 469/NCN equivalents.

Synthesis Example 3

A mixture of 800 g of 4,4'-dicyclohexylmethane diisocyanate (HMDI) and 4 g of a carbodiimidation catalyst was reacted at 180° C. for 6 hours to produce 4,4'-dicyclohexylmethane carbodiimide with an isocyanate group at the terminal (degree of polymerization: 1.2). Then, 726.7 g of thus obtained carbodiimide was reacted with 577.4 g of polyoxyethylenemonomethyl ether (degree of polymerization m=4) at 140° C. for 6 hours, to which 869.4 g of distilled water was gradually added to produce a pale yellow transparent carbodiimide resin solution (resin concentration: 60% by weight). It contained the carbodiimide at 783/NCN equivalents.

Synthesis Example 4

A mixture of 800 g of 2,6-tolylenediisocyanate (TDI), 441.4 g of polyoxyethylene monomethyl ether having polymerization degree m=8 was reacted at 50° C. for 1 hour as the initial stage, followed by the addition of 8 g of carbodiimidation catalyst and reaction at 85° C. for 6 hours to produce a carbodiimide resin with a terminal group capped (degree of polymerization: 7). Then, 709.6 g of distilled water was gradually added to the above product to produce a pale yellow transparent carbodiimide resin solution (resin concentration: 60% by weight). It contained the carbodiimide at 265/NCN equivalents.

The carbodiimide compounds prepared in SYNTHESIS EXAMPLES from 1 to 4 are summarized in Table 1.

TABLE 1

| Carbodiimide SYNTHESIS EXAMPLES | Diisocyanate as the starting compound | Degree of polymerization of the carbodiimide | Average molecular weight | NCN equivalents |
|---|---|---|---|---|
| SYNTHESIS EXAMPLE 1 | HMDI | 10.5 | 3671 | 350 |
| SYNTHESIS EXAMPLE 2 | HMDI | 2.7 | 3671 | 469 |
| SYNTHESIS EXAMPLE 3 | HMDI | 1.2 | 940 | 783 |
| SYNTHESIS EXAMPLE 4 | TDI | 7 | 1852 | 265 |

[Synthesis of Particles]

Trial Prepared Particle Example 1

Comparative Example 1

A 500 mL flask was charged with the mixture of the following composition all at once, and after purging dissolved oxygen by nitrogen, heated for around 15 hours in a flow of nitrogen with stirring by an agitator in an oil bath kept at 78° C. to obtain a styrene-methacrylic acid copolymer particle solution.

| | |
|---|---|
| Styrene | 48.2 parts |
| Methacrylic acid | 20.6 parts |
| Methanol | 179.8 parts |
| Ethanol | 29.9 parts |
| Water | 59.8 parts |
| Azobis-2-methylbutylonitrile (ABNE) | 3.0 parts |
| A styrene-methacrylate copolymer solution | 75.0 parts |

(wherein a styrene-methacrylate copolymer solution was a 40% by weight methanol solution of a copolymer of styrene/2-hydroxyethyl methacrylate = 2:8.)

(wherein a styrene-methacrylate copolymer solution was a 40% by weight methanol solution of a copolymer of styrene/2-hydroxyethyl methacrylate=2:8.)

Then a part of this particle solution was washed and filtrated repeatedly from about 3 to 5 times with a water-methanol (3:7) mixed solution using known vacuum filtration unit, followed by drying under vacuum to obtain particles. The particles were found to present a spherical particle group by morphology observation with SEM (S-2150 from Hitachi Co.). Average particle size was found to be 2.5 μm. A part of the powder particles was sampled and named as COMPARATIVE EXAMPLE 1.

Trial Prepared Particle Example 2

Comparative Example 2

A 500 mL flask was charged with the mixture of the following composition all at once, and after purging dissolved oxygen by nitrogen, heated for around 15 hours in a flow of nitrogen with stirring by an agitator in an oil bath kept at 80° C. to obtain a styrene-methacrylic acid copolymer particle solution.

| | |
|---|---|
| Styrene | 44.7 parts |
| Methacrylic acid | 24.1 parts |
| Methanol | 140.4 parts |
| Ethanol | 54.0 parts |
| Water | 75.6 parts |
| Azobis-isobutylonitrile (AIBN) | 3.0 parts |
| A styrene-methacrylate copolymer solution | 60.0 parts |

(wherein a styrene-methacrylate copolymer solution was a 40% by weight methanol solution of a copolymer of styrene/2-hydroxyethyl methacrylate = 1:9.)

(wherein a styrene-methacrylate copolymer solution was a 40% by weight methanol solution of a copolymer of styrene/2-hydroxyethyl methacrylate=1:9.)

Then this particle solution was washed and filtrated repeatedly from about 3 to 5 times with a water-methanol (3:7) mixed solution using known vacuum filtration unit, followed by drying under vacuum to obtain particles. The particles were found to present a spherical particle group by morphology observation with SEM (S-2150 from Hitachi Co.). Average particle size was found to be 8.8 μm. A part of the powder particles was sampled and named as COMPARATIVE EXAMPLE 2.

Trial Prepared Particle Example 3

Comparative Example 3

A 500 mL flask was charged with the mixture of the following composition all at once, and after purging dissolved oxygen by nitrogen, heated for around 15 hours in a flow of nitrogen with stirring by an agitator in an oil bath kept at 80° C. to obtain a styrene-methacrylic acid copolymer particle solution.

| | |
|---|---|
| Styrene | 48.2 parts |
| Methacrylic acid | 20.6 parts |
| Methanol | 220.8 parts |
| Water | 55.2 parts |
| Azobis-isobutylonitrile (AIBN) | 1.6 parts |
| A styrene-methacrylate copolymer solution | 62.8 parts |

(wherein a styrene-methacrylate copolymer solution was a 40% by weight methanol solution of a copolymer of styrene/2-hydroxyethyl methacrylate = 2:8.)

(wherein a styrene-methacrylate copolymer solution was a 40% by weight methanol solution of a copolymer of styrene/2-hydroxyethyl methacrylate=2:8.)

Then a part of this particle solution was washed and filtrated repeatedly from about 3 to 5 times with a water-methanol (3:7) mixed solution using known vacuum filtration unit, followed by drying under vacuum to obtain particles. The particles were found to present a spherical particle group by morphology observation with SEM (S-2150 from Hitachi Co.). Average particle size was found to be 5.2 μm. A part of the powder particles was sampled and named as COMPARATIVE EXAMPLE 3.

Trial Prepared Particle Example 4

Comparative Example 4

A 500 mL flask was charged with the mixture of the following composition all at once, and after purging dissolved oxygen by nitrogen, heated for around 15 hours in a flow of nitrogen with stirring by an agitator in an oil bath kept at 65° C. to obtain a styrene-methacrylic acid copolymer particle solution.

| | |
|---|---|
| Styrene | 77.4 parts |
| Methacrylic acid | 8.6 parts |
| Methanol | 207.0 parts |
| Water | 23.0 parts |
| Azobis-isobutylonitrile (AIBN) | 3.0 parts |
| A styrene-methacrylate copolymer solution | 47.6 parts |

(wherein a styrene-methacrylate copolymer solution was a 40% by weight methanol solution of a copolymer of styrene/2-hydroxyethyl methacrylate = 2:8.)

(wherein a styrene-methacrylate copolymer solution was a 40% by weight methanol solution of a copolymer of styrene/2-hydroxyethyl methacrylate=2:8.)

Then a part of this particle solution was washed and filtrated repeatedly from about 3 to 5 times with a water-methanol (3:7) mixed solution using known vacuum filtration unit, followed by drying under vacuum to obtain particles. The particles were found to present a spherical particle group by morphology observation with SEM (S-2150 from Hitachi Co.). Average particle size was found to be 2.6 μm. A part of the powder particles was sampled and named as COMPARATIVE EXAMPLE 4.

Trial Prepared Particle Example 5

Comparative Example 5

A 500 mL flask was charged with the mixture of the following composition all at once, and after purging dissolved oxygen by nitrogen, heated for around 15 hours in a flow of nitrogen with stirring by an agitator in an oil bath kept at 80° C. to obtain a styrene-methacrylic acid copolymer particle solution.

| | |
|---|---|
| Styrene | 48.2 parts |
| Methacrylic acid | 20.6 parts |
| Methanol | 179.8 parts |
| Ethanol | 29.9 parts |
| Water | 55.2 parts |
| Azobis-isobutylonitrile (AIBN) | 4.1 parts |
| A styrene-methacrylate copolymer solution | 62.8 parts |

(wherein a styrene-methacrylate copolymer solution was a 40% by weight methanol solution of a copolymer of styrene/2-hydroxyethyl methacrylate = 2:8.)

(wherein a styrene-methacrylate copolymer solution was a 40% by weight methanol solution of a copolymer of styrene/2-hydroxyethyl methacrylate=2:8.)

Then this particle solution was washed and filtrated repeatedly from about 3 to 5 times with a water-methanol (3:7) mixed solution using known vacuum filtration unit, followed by drying under vacuum to obtain particles. The particles were found to present a spherical particle group by morphology observation with SEM (S-2150 from Hitachi Co.). Average particle size was found to be 8.6 μm. A part of the powder particles was sampled and named as COMPARATIVE EXAMPLE 5.

TRIAL PREPARED PARTICLE EXAMPLES from 1 to 5 are summarized in Table 2.

TABLE 2

| | Reactive group in the particle | Equivalents of the reactive group | Starting compounds used |
|---|---|---|---|
| PARTICLE EXAMPLE 1 | Carboxyl | 287 | Styrene and methacrylic acid |
| PARTICLE EXAMPLE 2 | Carboxyl | 246 | Styrene and methacrylic acid |
| PARTICLE EXAMPLE 3 | Carboxyl | 287 | Styrene and methacrylic acid |
| PARTICLE EXAMPLE 4 | Carboxyl | 860 | Styrene and methacrylic acid |
| PARTICLE EXAMPLE 5 | Carboxyl | 287 | Styrene and methacrylic acid |

Synthesis Examples of Flat Particles

Example 1

A 300 mL flask was charged with the mixture of the following composition all at once, and heated for around 5 hours in a flow of nitrogen with stirring by an agitator in an oil bath kept at 50° C., to prepare a solution of particles with carbodiimide reacted.

| | |
|---|---|
| Solution of TRIAL PREPARED PARTICLE 1 | 25.0 parts |
| Carbodiimide resin solution prepared in SYNTHESIS EXAMPLE 1 | 25.2 parts |
| Water | 17.1 parts |
| Methanol | 108.9 parts |

Next, the solution was treated by 3 cycles of washing with a water-methanol mixed solution (3:7), around 2 cycles of washing with methanol and filtration by a known vacuum filtration unit, and dried under vacuum to prepare particles. The particles were found to present a flat particle group with concave part, by morphology observation with SEM (S-2150 from Hitachi Co.).

Figure 4:
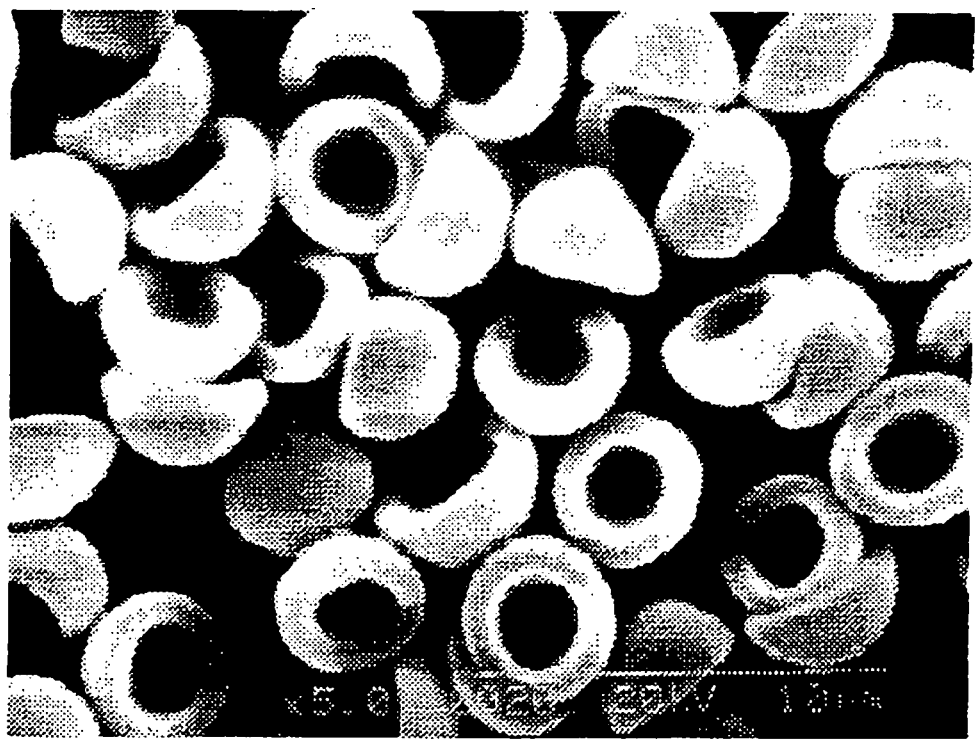
FIG. 4 shows a SEM photograph of a flat particle obtained in EXAMPLE 1.

Average diameters at flat surface and concave part were measured to be 3.92 μm and 2.16 μm, respectively. These particles showed an absorption band peak relevant to carbodiimide group at wavelength of around 2150 (1/cm), determined by a Fourier transform infrared spectrometer (Shimadzu Corp.'s FT-IR8200PC). FIG. 4 shows SEM photograph of the flat particle obtained.

Example 2

A 300 mL flask was charged with the mixture of the following composition all at once, and heated for around 4 hours in a flow of nitrogen with stirring by an agitator in an oil bath kept at 45° C., to prepare a solution of particles with carbodiimide reacted.

| | |
|---|---|
| TRIAL PREPARED PARTICLE 2 | 9.0 parts |
| Carbodiimide resin solution prepared in SYNTHESIS EXAMPLE 4 | 12.9 parts |
| Water | 65.8 parts |
| Methanol | 34.9 parts |

Next, the solution was treated by 3 cycles of washing with a water-methanol mixed solution (3:7), around 2 cycles of washing with THF and filtration by a known vacuum filtration unit, and dried under vacuum to prepare particles. The particles were found to present a flat particle group with concave part similar to EXAMPLE 1, by morphology observation with SEM (S-2150 from Hitachi Co.). Average diameters at flat surface and concave part were measured to be 10.24 μm and 6.31 μm, respectively. These particles showed an absorption band peak relevant to carbodiimide group at wavelength of around 2150 (1/cm), determined by a Fourier transform infrared spectrometer (Shimadzu Corp.'s FT-IR8200PC).

Example 3

A 300 mL flask was charged with the mixture of the following composition all at once, and heated for around 5 hours in a flow of nitrogen with stirring by an agitator in an oil bath kept at 50° C., to prepare a solution of particles with carbodiimide reacted.

| | |
|---|---|
| Solution of TRIAL PREPARED PARTICLE 3 | 15.0 parts |
| Carbodiimide resin solution prepared in SYNTHESIS EXAMPLE 2 | 17.3 parts |
| Water | 11.7 parts |
| Methanol | 74.5 parts |

Next, the solution was treated by 3 cycles of washing with a water-methanol mixed solution (3:7), around 2 cycles of washing with methanol and filtration by a known vacuum filtration unit, and dried under vacuum to prepare particles. The particles were found to present a flat particle group with concave part similar to EXAMPLE 1, by morphology observation with SEM (S-2150 from Hitachi Co.). Average diameters at flat surface and concave part were measured to be 7.18 μm and 3.48 μm, respectively. These particles showed an absorption band peak relevant to carbodiimide group at wavelength of around 2150 (1/cm), determined by a Fourier transform infrared spectrometer (Shimadzu Corp.'s FT-IR8200PC).

Example 4

A 300 mL flask was charged with the mixture of the following composition all at once, and heated for around 5 hours in a flow of nitrogen with stirring by an agitator in an oil bath kept at 50° C., to prepare a solution of particles with carbodiimide reacted.

| | |
|---|---|
| Solution of TRIAL PREPARED PARTICLE 3 | 10.0 parts |
| Carbodiimide resin solution prepared in SYNTHESIS EXAMPLE 3 | 19.2 parts |
| Water | 13.1 parts |
| Methanol | 83.0 parts |

Next, the solution was treated by 3 cycles of washing with a water-methanol mixed solution (3:7), around 2 cycles of washing with DMF and filtration by a known vacuum filtration unit, and dried under vacuum to prepare particles. The particles were found to present a flat particle group with 2 flat planes and fine concave part, by morphology observation with SEM (S-2150 from Hitachi Co.). Average diameters at flat surface and concave part were measured to be 6.20 μm and 0.48 μm, respectively. These particles showed an absorption band peak relevant to carbodiimide group at wavelength of around 2150 (1/cm), determined by a Fourier transform infrared spectrometer (Shimadzu Corp.'s FT-IR8200PC).

Example 5

A 300 mL flask was charged with the mixture of the following composition all at once, followed by dispersion using an agitator at room temperature for 1 hour, addition of 0.1 g of tributylamine as a catalyst and heating for around 4.5 hours in a flow of nitrogen in an oil bath kept at 75° C., to prepare a solution of particles with an epoxy group reacted.

| | |
|---|---|
| TRIAL PREPARED PARTICLE 5 | 10.0 parts |
| Denacol ™ EX-1610 | 14.8 parts |
| Methanol | 41.5 parts |
| Water | 57.7 parts |

(wherein "Denacol ™ EX-1610" is an epoxy compound from Nagase ChemteX Co. Ltd., having 170 epoxy equivalents.)

(wherein "Denacol™ EX-1610" is an epoxy compound from Nagase ChemteX Co. Ltd., having 170 epoxy equivalents.)

Next, the solution was treated by 3 cycles of washing with a water-methanol mixed solution (3:7), around 2 cycles of washing with THF and filtration by a known vacuum filtration unit, and dried under vacuum to prepare particles. The particles were found to present a flat particle group with concave part similar to EXAMPLE 1, by morphology observation with SEM (S-2150 from Hitachi Co.). Average diameters at flat surface and concave part were measured to be 9.85 μm and 6.19 μm, respectively. These particles showed an absorption band peak relevant to an epoxy group at wavelength of around 910 (1/cm), determined by a Fourier transform infrared spectrometer (Shimadzu Corp.'s FT-IR8200PC).

Synthesis Examples of Comparative Particles

Comparative Example 6

A 300 mL flask was charged with the mixture of the following composition all at once, followed by heating for around 5 hours in a flow of nitrogen in an oil bath kept at 50° C. while stirring with an agitator, to prepare a solution of particles with a carbodiimide reacted (under the same conditions as in EXAMPLE 3 except that a solution of TRIAL PREPARED PARTICLE 4 was used).

| | |
|---|---|
| SOLUTION OF TRIAL PREPARED PARTICLE 4 | 30.0 parts |
| Carbodiimide resin solution prepared in SYNTHESIS EXAMPLE 2 | 18.8 parts |

-continued

| | |
|---|---|
| Water | 12.8 parts |
| Methanol | 81.0 parts |

Next, the solution was treated by 3 cycles of washing with a water-methanol mixed solution (3:7), around 2 cycles of washing with methanol and filtration by a known vacuum filtration unit, and dried under vacuum to prepare particles. The particles were found to present a spherical particle group with average particle diameter of 3.47 μm and not a flat particle group, by morphology observation with SEM (S-2150 from Hitachi Co.). These particles showed an absorption band peak relevant to a carbodiimide group at wavelength of around 2150 (1/cm), determined by a Fourier transform infrared spectrometer (Shimadzu Corp.'s FT-IR8200PC).

Comparative Example 7

A 300 mL flask was charged with the mixture of the following composition all at once, followed by heating for around 18 hours in a flow of nitrogen in an oil bath kept at 50° C. while stirring with an agitator, to prepare a solution of particles with a carbodiimide reacted (under the same conditions as in EXAMPLE 1 except that synthesis time was changed).

| | |
|---|---|
| SOLUTION OF TRIAL PREPARED PARTICLE 1 | 25.0 parts |
| Carbodiimide resin solution prepared in SYNTHESIS EXAMPLE 1 | 25.2 parts |
| Water | 17.1 parts |
| Methanol | 108.9 parts |

Next, the solution was treated by 3 cycles of washing with a water-methanol mixed solution (3:7), around 2 cycles of washing with THF and filtration by a known vacuum filtration unit, and dried under vacuum to prepare particles. The particles were found to present a spherical particle group with average particle diameter of 3.51 μm and not a flat particle group, by morphology observation with SEM (S-2150 from Hitachi Co.). These particles showed an absorption band peak relevant to a carbodiimide group at wavelength of around 2150 (1/cm), determined by a Fourier transform infrared spectrometer (Shimadzu Corp.'s FT-IR8200PC).

Comparative Example 8

A 300 mL flask was charged with the mixture of the following composition all at once, followed by heating for around 15 hours in a flow of nitrogen in an oil bath kept at 45° C. while stirring with an agitator, to prepare a solution of particles with a carbodiimide reacted.

| | |
|---|---|
| SOLUTION OF TRIAL PREPARED PARTICLE 3 | 20.0 parts |
| Carbodiimide resin solution prepared in SYNTHESIS EXAMPLE 2 | 13.8 parts |
| Water | 9.4 parts |
| Methanol | 59.6 parts |

Figure 5:
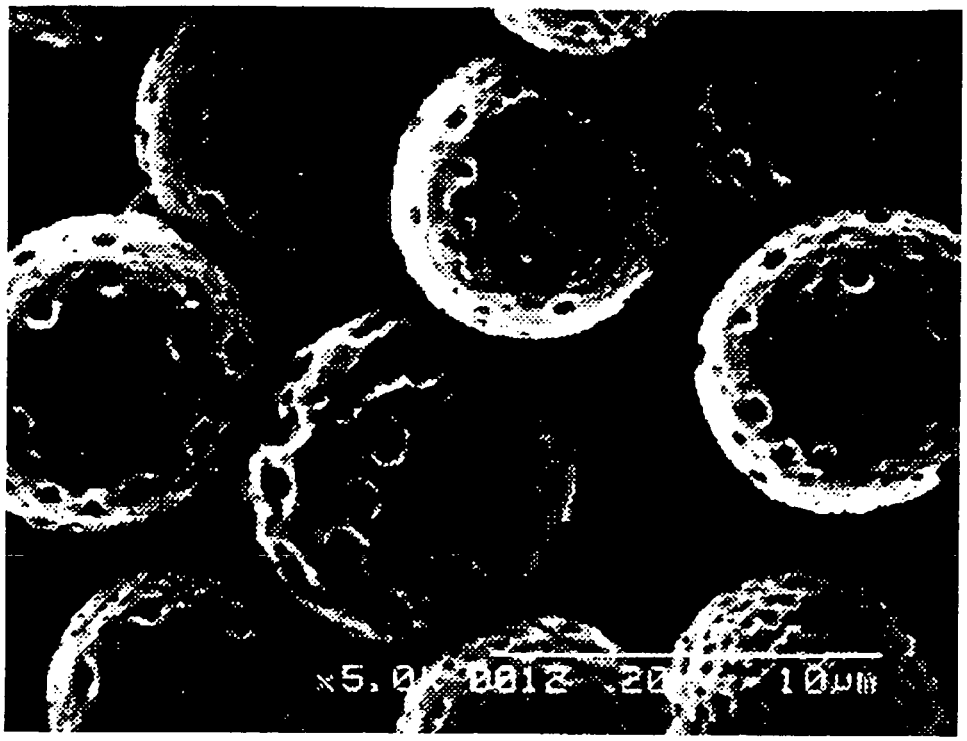
FIG. 5 shows a SEM photograph of a flat particle obtained in COMPARATIVE EXAMPLE 7.

Next, the solution was treated by 3 cycles of washing with a water-methanol mixed solution (3:7), around 2 cycles of washing with methanol and filtration by a known vacuum filtration unit, and dried under vacuum to prepare particles. The particles were found to present a porous spherical particle group with average particle diameter of 7.08 μm and not a flat particle group, by morphology observation with SEM (S-2150 from Hitachi Co.). These particles showed an absorption band peak relevant to a carbodiimide group at wavelength of around 2150 (1/cm), determined by a Fourier transform infrared spectrometer (Shimadzu Corp.'s FT-IR8200PC). SEM photograph of the particle is shown in FIG. 5.

EXAMPLES from 1 to 5 and COMPARATIVE EXAMPLES from 1 to 8 are summarized in Tables 3 and 4.

TABLE 3

| EX-AMPLE | Starting diisocyanate compound for carbodiimidation | Content of carbodiimide (equivalents), (NCN/reactive group) | Reaction temperature (° C.) | Reaction time (h) |
|---|---|---|---|---|
| 1 | HMDI | 3 | 50 | 5 |
| 2 | TDI | 0.8 | 45 | 4 |
| 3 | HMDI | 2.5 | 50 | 5 |
| 4 | HMDI | 2.5 | 50 | 5 |

| EX-AMPLE | Epoxy compound | Content of epoxy (equivalents) | Reaction temperature (° C.) | Reaction time (h) |
|---|---|---|---|---|
| 5 | Denacol EX-1610 | 2.5 | 75 | 4.5 |

TABLE 4

| COM-PARATIVE EXAMPLES | Starting diisocyanate compound for carbodiimidation | Content of carbodiimide (equivalents), (NCN/reaction group) | Reaction temperature (° C.) | Reaction time (h) |
|---|---|---|---|---|
| 1 | — | — | — | — |
| 2 | — | — | — | — |
| 3 | — | — | — | — |
| 4 | — | — | — | — |
| 5 | — | — | — | — |
| 6 | HMDI | 2.5 | 50 | 5 |
| 7 | HMDI | 3 | 50 | 18 |
| 8 | HMDI | 1.5 | 45 | 15 |

Evaluation Test 1

Evaluation of Flatness

SEM photographs were taken for particles in EXAMPLE PARTICLES from 1 to 5, in magnification (from 50 to 10,000 times) sufficient to measure particle diameter. Flat surface diameter D, particle thickness d and concave part diameter L were measured n1=500 times randomly per particle and averaged to obtain average flat surface diameter D', average particle thickness d' and average concave part diameter L'. Average ratio (P) between surface diameter D and particle thickness d was determined by the following equation:

Averaged ratio $(P)$=average flat surface diameter $(D')$/average thickness $(d')$ Calculation results are shown in Table 5.

TABLE 5

| EXAMPLE | Average flat surface diameter (D') (μm) | Average particle thickness (d') (μm) | Average concave part diameter (L') (μm) | Average ratio (P) |
|---|---|---|---|---|
| 1 | 3.92 | 2.16 | 2.16 | 1.81 |
| 2 | 10.24 | 6.21 | 6.31 | 1.65 |
| 3 | 7.18 | 3.40 | 3.48 | 2.11 |
| 4 | 6.20 | 1.85 | 0.48 | 3.35 |
| 5 | 9.85 | 5.73 | 6.19 | 1.72 |

It could be confirmed by the results on particles in EVALUATION TEST 1 and EXAMPLES 1 to 5, by a Fourier transform infrared spectrometer that the particles consisting of a base particle (A) and an organic compound (B) are flat particles within specified range.

Evaluation Test 2

Evaluation of Solvent Resistance and Dispersability in a Solution

Into a 300 ml flask, 1 g of each particle in EXAMPLES from 1 to 5 and COMPARATIVE EXAMPLES from 1 to 5 and 100 ml of water or an organic solvent described below, followed by stirring at ambient temperature for 30 minutes and naked eye evaluation of solvent resistance. Morphology was also confirmed by SEM (S-2150 from Hitachi Co.). These evaluation results are shown in Table 6.

TABLE 6

| Solvents | Water | | Methanol | | Ethanol | | Toluene | | DMF | |
|---|---|---|---|---|---|---|---|---|---|---|
| Evaluation test 2 | Visual observation | SEM analysis | Visual observation | SEM analysis | Visual observation | SEM analysis | Visual observation | SEM analysis | Visual observation | SEM analysis |
| EXAMPLE 1 | ○ | 1 | ○ | 1 | ○ | 1 | ○ | 1 | ○ | 1 |
| EXAMPLE 2 | ○ | 1 | ○ | 1 | ○ | 1 | ○ | 1 | ○ | 1 |
| EXAMPLE 3 | ○ | 1 | ○ | 1 | ○ | 1 | ○ | 1 | ○ | 1 |
| EXAMPLE 4 | ○ | 1 | ○ | 1 | ○ | 1 | ○ | 1 | ○ | 1 |
| EXAMPLE 5 | ○ | 1 | ○ | 1 | ○ | 1 | ○ | 1 | ○ | 1 |
| COMPARATIVE EXAMPLE 1 | ○ | 1 | x | 0 | x | 0 | Δ | 0 | x | 0 |
| COMPARATIVE EXAMPLE 2 | ○ | 1 | x | 0 | x | 0 | ○ | 1 | x | 0 |
| COMPARATIVE EXAMPLE 3 | ○ | 1 | x | 0 | x | 0 | Δ | 0 | x | 0 |
| COMPARATIVE EXAMPLE 4 | ○ | 1 | x | 0 | x | 0 | x | 0 | x | 0 |
| COMPARATIVE EXAMPLE 5 | ○ | 1 | x | 0 | x | 0 | Δ | 0 | x | 0 |

| Solvents | THF | | MEK | | Acetone | | Dichloromethane | |
|---|---|---|---|---|---|---|---|---|
| Evaluation test 2 | Visual observation | SEM analysis | Visual observation | SEM analysis | Visual observation | SEM analysis | Visual observation | SEM analysis |
| EXAMPLE 1 | ○ | 1 | ○ | 1 | ○ | 1 | ○ | 1 |
| EXAMPLE 2 | ○ | 1 | ○ | 1 | ○ | 1 | ○ | 1 |
| EXAMPLE 3 | ○ | 1 | ○ | 1 | ○ | 1 | ○ | 1 |
| EXAMPLE 4 | ○ | 1 | ○ | 1 | ○ | 1 | ○ | 1 |
| EXAMPLE 5 | ○ | 1 | ○ | 1 | ○ | 1 | ○ | 1 |
| COMPARATIVE EXAMPLE 1 | x | 0 | x | 0 | x | 0 | ○ | 1 |
| COMPARATIVE EXAMPLE 2 | x | 0 | x | 0 | x | 0 | Δ | 0 |
| COMPARATIVE EXAMPLE 3 | x | 0 | x | 0 | x | 0 | ○ | 1 |
| COMPARATIVE EXAMPLE 4 | x | 0 | x | 0 | x | 0 | x | 1 |
| COMPARATIVE EXAMPLE 5 | x | 0 | x | 0 | x | 0 | ○ | 1 |

○: Dispersed
Δ: Partly dispersed
x: Dissolved
1: Particle retaining shape of the base particle
0: Particle no longer retaining shape of the base particle It could be confirmed by the results of Evaluation Test 2 (for particles in EXAMPLES from 1 to 5 and COMPARATIVE EXAMPLES from 1 to 5) that a hardened flat particles (particles in EXAMPLES from 1 to 5) have superior solvent resistance, while base particles (particles in COMPARATIVE EXAMPLES from 1 to 5) were inferior in solvent resistance and easily dissolved in many organic solvents. Based on these, it was confirmed that new bonding groups comprising a base particle and an organic compound were formed in a flat particle of the present invention. Dispersibility in a solution was also good for water and organic solvents not dissolve these particles.

Evaluation Test 3

Evaluation of Heat Resistance

In an aluminum Petri dish, 1 g of each particle in EXAMPLES from 1 to 5 and COMPARATIVE EXAMPLES from 1 to 5 was charged, followed by curing in a dryer kept at 180° C. for 1 hour and checked residue (particle) in the aluminum Petri dish. Particle morphology was also confirmed with SEM (S-2150 from Hitachi Co.). These evaluation results are shown in Table 7.

TABLE 7

| Evaluation test 3 | Visual observation | SEM analysis |
| --- | --- | --- |
| EXAMPLE 1 | ○ | 2 |
| EXAMPLE 2 | ○ | 2 |
| EXAMPLE 3 | ○ | 2 |
| EXAMPLE 4 | ○ | 2 |
| EXAMPLE 5 | ○ | 2 |
| COMPARATIVE EXAMPLE 1 | x | 0 |
| COMPARATIVE EXAMPLE 2 | Δ | 1 |
| COMPARATIVE EXAMPLE 3 | x | 0 |
| COMPARATIVE EXAMPLE 4 | x | 0 |
| COMPARATIVE EXAMPLE 5 | x | 0 |

○: Particle retaining its shape
Δ: Particle dissolved to some extent
x: Particle dissolved into a plate shape
2: Particle retaining its original shape
1: Particle deformed
0: Particle no longer retaining its particular shape It could be confirmed from the results of Evaluation Test 3 (for particles in EXAMPLES from 1 to 5 and COMPARATIVE EXAMPLES from 1 to 5) that hardened flat particles (particles in EXAMPLES from 1 to 5) are superior in heat resistance, while base particles (particles in COMPARATIVE EXAMPLES from 1 to 5) showed insufficient heat resistance. Based on these, it was confirmed that new bonding groups comprising a base particle and an organic compound were formed in a flat particle of the present invention.

Evaluation Test 4

Evaluation of Glueability and Tackiness

Each 5% by weight particle solution was prepared by dispersing 0.5 g of each particle obtained in EXAMPLES from 1 to 5 and COMPARATIVE EXAMPLES from 1 to 5 in 9.5 g of a water/methanol (3:7) solution. Then a slide glass was coated with small amount of the solution, followed by drying in a dryer kept at 80° C. for 1 hour and air blowing (2.0 kgf/cm$^2$) for 10 seconds from 10 cm above the slide glass to evaluate glueability and tackiness by surface observation. These evaluation results are shown in Table 8.

TABLE 8

| Evaluation test 4 | Glueability/tackiness |
| --- | --- |
| EXAMPLE 1 | ○ |
| EXAMPLE 2 | □ |
| EXAMPLE 3 | □ |
| EXAMPLE 4 | Δ |
| EXAMPLE 5 | Δ |
| COMPARATIVE EXAMPLE 1 | X |
| COMPARATIVE EXAMPLE 2 | Δ |
| COMPARATIVE EXAMPLE 3 | X |
| COMPARATIVE EXAMPLE 4 | X |
| COMPARATIVE EXAMPLE 5 | X |

○: No peeling
□: Partial peeling
Δ: Peeling by half or more
X: Almost whole peeling It could be confirmed from the results of Evaluation Test 4 (for particles in EXAMPLES from 1 to 5 and COMPARATIVE EXAMPLES from 1 to 5) that flat particles of the present invention (particles in EXAMPLES from 1 to 5) provide superior glueability and tackiness, while base particles (particles in COMPARATIVE EXAMPLES from 1 to 5) do not provide sufficient glueability and tackiness.

Evaluation Test 5

Evaluation of Adhesion and Solvent Resistance

Each 5% by weight particle solution was prepared by dispersing 0.5 g of each particle obtained in EXAMPLES from 1 to 5 and COMPARATIVE EXAMPLES from 1 to 5 in 9.5 g of a water/methanol (3:7) solution. Then a slide glass coated beforehand with an amino group containing silane coupling agent (from Corning Co.), was coated with small amount of the solution, followed by drying in a dryer kept at 150° C. for 30 minutes, immersing thus heat treated slide glass in a THF bath (5 l) for 20 minutes and air drying to evaluate adhesion by observation of slide glass surface. Morphology was re-confirmed with SEM on samples with substances adhered. These evaluation results are shown in Table 9.

TABLE 9

| Evaluation test 5 | Visually observed deposits | SEM analysis |
| --- | --- | --- |
| EXAMPLE 1 | ○ | Particle retaining its original shape |
| EXAMPLE 2 | ○ | Particle retaining its original shape |
| EXAMPLE 3 | Δ | Particle retaining its original shape |
| EXAMPLE 4 | Δ | Particle retaining its original shape |
| EXAMPLE 5 | Δ | Particle retaining its original shape |

TABLE 9-continued

| Evaluation test 5 | Visually observed deposits | SEM analysis |
|---|---|---|
| COMPARATIVE EXAMPLE 1 | x | — |
| COMPARATIVE EXAMPLE 2 | x | — |
| COMPARATIVE EXAMPLE 3 | x | — |
| COMPARATIVE EXAMPLE 4 | x | — |
| COMPARATIVE EXAMPLE 5 | x | — |

Visually observed deposits evaluation
o: Deposits observed
Δ: partialy deposits observed
x: No deposits observed (particle dissolved or peeled)

It could be confirmed from the results of Evaluation Test 5 (for particles in EXAMPLES from 1 to 5 and COMPARATIVE EXAMPLES from 1 to 5) that particles in EXAMPLES from 1 to 5 provide superior adhesion and solvent resistance, while particles in Comparative EXAMPLES from 1 to 5 do not provide sufficient glueability and solvent resistance (chemical resistance).

Synthesis Examples of Flat Particles Adhered with Fine Particles

Example 6

A 500 mL beaker was charged with 20 g of titanium oxide (average particle diameter; 20 nm, from Ishihara Sangyo Co. Ltd.), 2.6 g of a dispersion agent ("Solsperse™ 4300" from Abisia Co., Ltd.) and 230 g of a water-methanol mixture solution (weight ratio: 2/8), followed by mixing while stirring to produce a solution dispersed with 8% by weight of fine particles of titanium oxide by using a known ultrasonic dispersion unit.

Then a 500 mL flask was charged with the mixture of the following composition all at once, and heated for around 5 hours in a flow of nitrogen with stirring by an agitator in an oil bath kept at 50° C., to prepare a solution of particles with carbodiimide reacted.

| Solution of TRIAL PREPARED PARTICLE 1 | 35.0 parts |
|---|---|
| Carbodiimide resin solution prepared in SYNTHESIS EXAMPLE 1 | 35.3 parts |
| Water | 23.9 parts |
| Methanol | 152.5 parts |
| Solution dispersed with 8% by weight of fine titanium oxide | 3.6 parts |

Next, the solution was treated by around 5 cycles of washing with a water-methanol mixture solution (3:7) and filtration by a known vacuum filtration unit, and dried under vacuum to prepare particles. The particles were found to present a flat particle group with concave part and high quantity of fine particles not larger than 300 nm adhered on the particle surface, by morphology observation with SEM (S-2150 from Hitachi Co.).

Figure 6:
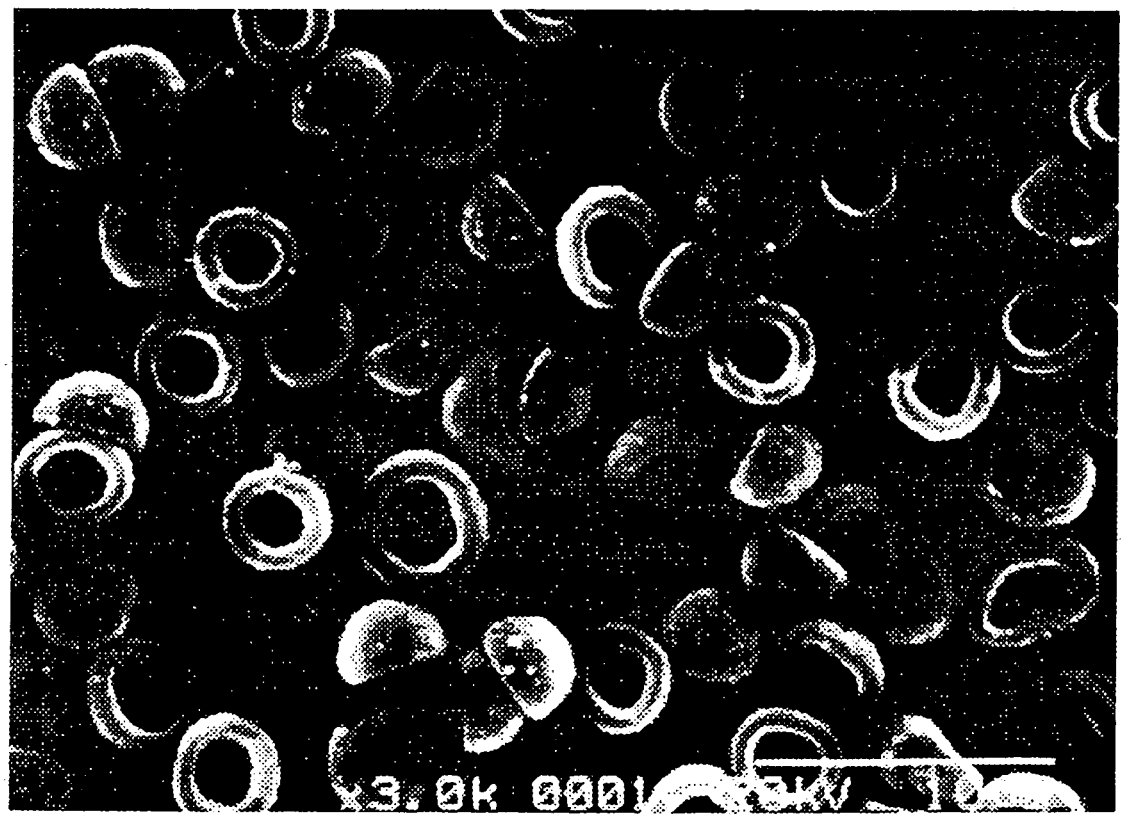
FIG. 6 shows a SEM photograph of a flat particle obtained in EXAMPLE 5.

Average diameters at flat surface and concave part were measured to be 4.38 μm and 2.49 μm, respectively. These particles further showed an absorption band peak relevant to carbodiimide group at wavelength of around 2150 (1/cm), determined by a Fourier transform infrared spectrometer (Shimadzu Corp.'s FT-IR8200PC). FIG. 6 shows SEM photograph of the particle.

Evaluation Test 6

Evaluation of Light Diffusion and Light Concentration

<Preparations of Light Diffusion Test Sheets>

Light Diffusion Sheet Example 1

The following composition was mixed and coated on one surface side of 100 μm thick PET film ("E-5000" from Toyobo Co., Ltd.) using a bar coater with gap height of 100 μm, followed by hot air drying using a dryer to produce LIGHT DIFFUSION TEST SHEET.

| Binder resin: acrylic resin | 20 g |
|---|---|
| Polymer particle | not used |
| Water | 2 g |

(wherein "JONCRYL ™ 734" from Johnson Polymer Co. was used as an acrylic resin.)

(wherein "JONCRYL™ 734" from Johnson Polymer Co. was used as an acrylic resin.)

Light Diffusion Sheet Example 2

The following composition was mixed and coated on one surface side of 100 μm thick PET film ("E-5000" from Toyobo Co., Ltd.) using a bar coater with gap height of 100 μm, followed by hot air drying using a dryer to produce LIGHT DIFFUSION TEST SHEET.

| Binder resin: acrylic resin | 20 g |
|---|---|
| Polymer particle: spherical particle of COMPARATIVE EXAMPLE 1 | 5 g |
| Water | 2 g |

(wherein "JONCRYL ™ 734" from Johnson Polymer Co. was used as an acrylic resin.)

(wherein "JONCRYL™ 734" from Johnson Polymer Co. was used as an acrylic resin.)

Light Diffusion Sheet Example 3

The following composition was mixed and coated on one surface side of 100 μm thick PET film ("E-5000" from Toyobo Co., Ltd.) using a bar coater with gap height of 100 μm, followed by hot air drying using a dryer to produce LIGHT DIFFUSION TEST SHEET.

| Binder resin: acrylic resin | 20 g |
|---|---|
| Polymer particle: spherical particle of COMPARATIVE EXAMPLE 7 | 5 g |
| Water | 2 g |

(wherein "JONCRYL ™ 734" from Johnson Polymer Co. was used as an acrylic resin.)

(wherein "JONCRYL™ 734" from Johnson Polymer Co. was used as an acrylic resin.)

Light Diffusion Sheet Example 4

The following composition was mixed and coated on one surface side of 100 μm thick PET film ("E-5000" from Toyobo Co., Ltd.) using a bar coater with gap height of 100 μm, followed by hot air drying using a dryer to produce LIGHT DIFFUSION TEST SHEET.

TABLE 10

| Evaluation test 6 | Particle Used | Turbidity (%) | Total light transmittance (%) | Diffusion degree (%) | Brightness (front surface) | Brightness (45 degree) |
|---|---|---|---|---|---|---|
| SHEET EXAMPLE 1 | Not used | 0.27 | 92.6 | 0.25 | x | x |
| SHEET EXAMPLE 2 | Comparative Example 1 | 96.2 | 91.4 | 87.3 | Δ | Δ |
| SHEET EXAMPLE 3 | Comparative Example 7 | 97.5 | 89.2 | 87.1 | Δ | Δ |
| SHEET EXAMPLE 4 | Example 1 | 93.6 | 90.1 | 84.2 | o | ▲ |
| SHEET EXAMPLE 5 | Example 6 | 94.2 | 90.8 | 85.5 | o | Δ |

Light transmittance
o: Bright
Δ: Relatively bright
▲: Relatively dark
x: Transmitting

| Binder resin: acrylic resin | 20 g |
|---|---|
| Polymer particle: flat particle of EXAMPLE 1 | 5 g |
| Water | 2 g |

(wherein "JONCRYL ™ 734" from Johnson Polymer Co. was used as an acrylic resin.)

(wherein "JONCRYL™ 734" from Johnson Polymer Co. was used as an acrylic resin.)

Light Diffusion Sheet Example 5

The following composition was mixed and coated on one surface side of 100 μm thick PET film ("E-5000" from Toyobo Co., Ltd.) using a bar coater with gap height of 100 μm, followed by hot air drying using a dryer to produce LIGHT DIFFUSION TEST SHEET.

| Binder resin: acrylic resin | 20 g |
|---|---|
| Polymer particle: flat particle adhered with inorganic particles of EXAMPLE 6 | 5 g |
| Water | 2 g |

(wherein "JONCRYL ™ 734" from Johnson Polymer Co. was used as an acrylic resin.)

(wherein "JONCRYL™ 734" from Johnson Polymer Co. was used as an acrylic resin.)

Figure 7:
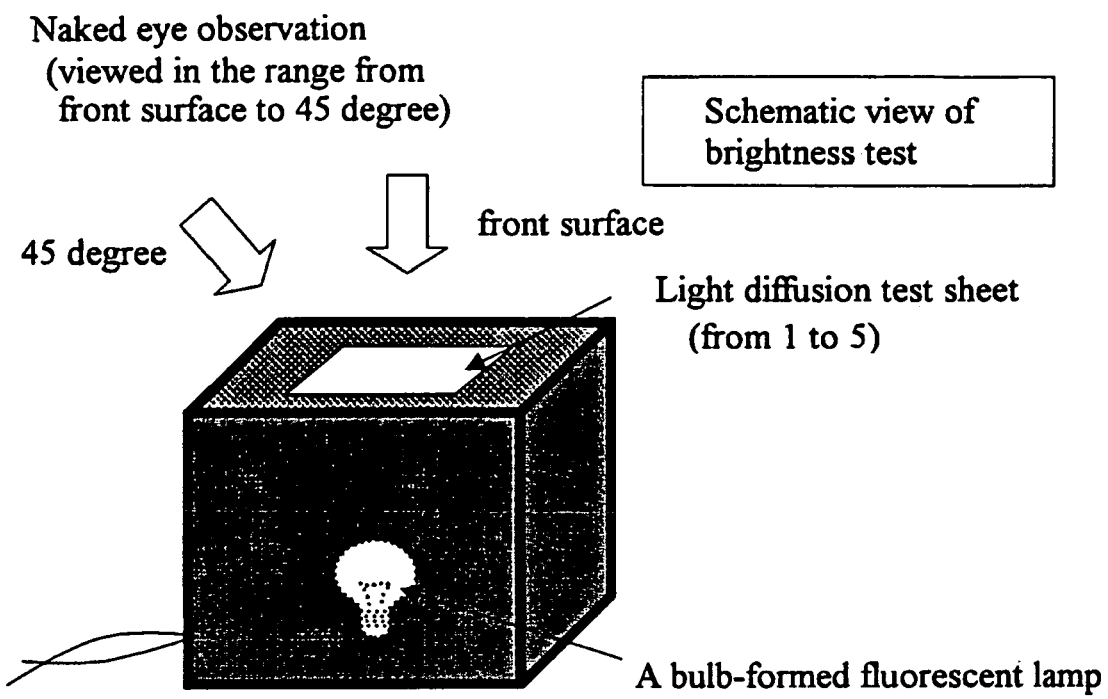
FIG. 7 is a schematic drawing of a brightness test.

Using the above LIGHT DIFFUSION TEST SHEETS 1 to 5, light transmittance was measured using a turbidimeter ("NDH 2000" from Japan Denshoku Industry Co., Ltd.). At the top area of a trial prepared stereo type darkroom with square opening frame only at the top, the LIGHT DIFFUSION TEST SHEET was plastered, as shown in FIG. 7. Then, a bulb-formed fluorescent lamp was set inside the room and brightness looked from front side was evaluated by naked eye observation from vertical direction and from around 45° direction from vertical direction. These results are shown in Table 10.

The bulb-formed fluorescent lamp in the brightness test was adjusted to 100 V and the lamp position was fixed, and eye position was determined to be 50 cm above the upper part of the darkroom, so that the same conditions were secured for every LIGHT DIFFUSION TEST SHEET.

It could be confirmed from the results of Evaluation Test 6 that LIGHT DIFFUSION TEST SHEETS 2 to 5 which contain particles provide sufficient turbidity and diffusion function. Further, in LIGHT DIFFUSION TEST SHEETS 4 and 5, which use flat particles obtained by the present invention, are found brighter by naked eye observation (front surface) from vertical direction than LIGHT DIFFUSION TEST SHEETS 2 and 3, which use spherical particles, by which it was confirmed that use of flat particles obtained by the present invention enhanced light focusing.

It is thus clarified by the results of above-described EXAMPLES, COMPARATIVE EXAMPLES and EVALUATION TESTS that EXAMPLES from 1 to 6 of the present invention can provide at least one effect among crosslinking, heat resistance, solvent resistance, adhesion, glueability, tackiness and dispersibility in a solvent, as a functional flat particle containing an organic compound. Further, a flat particle of the present invention was found to provide not only superior hiding power, whiteness and light diffusion property but also superior light focusing.

On the other hand, particles in COMPARATIVE EXAMPLES from 1 to 8 were not flat particles and particles in COMPARATIVE EXAMPLES from 1 to 5 provided no characteristics derived from organic compounds.

From these results, it is clarified that a novel flat particle of the present invention is obtained by new bonding and can provide good crosslinking, resistance to heat - and solvents, adhesion, glueability, tackiness and dispersibility in a solvent and thus a highly superior functional flat particle.

A flat particle according to the present invention can be obtained by mixing and bonding a particle having a group reactive with an organic compound with the organic compound in the presence of water or an organic solvent which is a non-solvent for the particle but a solvent for the organic compound. On the aspect of performance thereof, improvement of resistance to heat and solvents as a crosslinkable particle is provided, and when an organic compound is present at a surface layer of the flat particle, excellent effects of adhesion, glueability, tackiness and dispersibility as a flat particle, along with superior mechanical and functional characteristics, can be obtained.

As it is a flat particle retaining excellent performance as above, and it has excellent hiding power, whiteness, light diffusion property, smoothness, and the like as compared with the usual particles, it can be used in wide application fields such as static charge developers, paints, coating agents for paper coating or coating on information recording paper, and the like, adhesives, tackifiers, light diffusion agents, materials for automobile and electric/electronic industries, perfuming agents, cosmetics, medicines, pesticides, building materials, and the like.

What is claimed is:

1. A flat particle comprising a base particle (A) having functional groups and an organic compound (B) having reaction groups reactive with the functional groups of said base particle (A) and which is soluble in a solvent, characterized in that at least a part of the functional groups present in the base particle (A) and at least a part of the reaction groups present in the organic compound (B) are reacted with each other to form crosslinked structure, wherein the reaction groups of the organic compound (b) is at least one reactive group selected from the group consisting of an epoxy group, an oxazoline group and a carbodiimide group.

2. The flat particle according to claim 1, characterized in that the functional group of the base particle (A) is an active hydrogen group.

3. The flat particle according to claim 2, characterized in that the active hydrogen group of the base particle (A) is at least one functional group selected from a hydroxyl group, a carboxyl group, an amino group or a thiol group.

4. The flat particle according to claim 1, characterized in that the amount of the functional group of the base particle (A) is 50 to 700 equivalents.

5. The flat particle according to claim 1, characterized in that the amount of the reaction group of the organic compound (B) is 50 to 1,000 equivalents.

6. The flat particle according to claim 1, characterized in that at least a part of the reaction groups in the organic compound (B), which has not reacted with the functional group of the base particle (A), resides at the surface of the base particle (A), and thus at least one of characteristics selected from glueability, tackiness, adhesion or dispersibility in a solution is furnished.

7. The flat particle according to claim 1, characterized in that other fine particles are further attached or contained at the surface or the inner part of the flat particle.

8. A method for producing the flat particle according to claim 1, characterized by comprising the first step wherein a base particle (A) having a functional group and not containing a monomer with an unsaturated double bond and an organic compound (B) which has a reaction group reactive with the functional group of said base particle (A) are made to mixed state in the presence of at least one kind of a solvent selected from an organic solvent or water which is a non-solvent for the base particle (A) but a solvent for the organic compound (B), the second step wherein crosslinked structure is provided by reaction of the base particle (A) and the organic compound (B), and the third step wherein a pure particle is obtained by removing a solvent from a solution of a particle obtained, wherein the reaction groups of the organic compound (b) is at least one reactive group selected from the group consisting of an epoxy group, an oxazoline group and a carbodiimide group.

9. The method for producing the flat particle according to claim 8, characterized by adding the step wherein fine particles are added in any of the first to the third steps or after these steps.

10. The method for producing the flat particle according to claims 8 or 9, characterized in that the amount of the reaction group of the organic compound (B) is 50 to 1,000 equivalents.

11. The method for producing the flat particle according to claims 8 or 9, characterized in that the amount of the functional group of the base particle (A) is 50 to 700 equivalents.

12. The flat particle according to claim 1, wherein said at least one reactive group is selected from the group consisting of an epoxy group and a carbodiimide group.

13. The flat particle according to claim 12, wherein said at least one reactive group is a carbodiimide group.

14. The method of producing the flat particle according to claim 8, wherein said at least one reactive group is selected from the group consisting of an epoxy group and a carbodiimide group.

15. The method of producing the flat particle according to claim 14, wherein said at least one reactive group is a carbodiimide group.

* * * * *